United States Patent
Shimogawa

(10) Patent No.: US 9,588,789 B2
(45) Date of Patent: Mar. 7, 2017

(54) MANAGEMENT APPARATUS AND WORKLOAD DISTRIBUTION MANAGEMENT METHOD

(71) Applicant: FUJITSU LIMITED, Kawasaki-shi, Kanagawa (JP)

(72) Inventor: Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/603,841

(22) Filed: Jan. 23, 2015

(65) Prior Publication Data
US 2015/0234670 A1    Aug. 20, 2015

(30) Foreign Application Priority Data
Feb. 19, 2014 (JP) ................................. 2014-029801

(51) Int. Cl.
G06F 9/455 (2006.01)
G06F 9/50 (2006.01)

(52) U.S. Cl.
CPC ........ G06F 9/45533 (2013.01); G06F 9/5083 (2013.01); G06F 2009/45583 (2013.01)

(58) Field of Classification Search
None
See application file for complete search history.

(56) References Cited

U.S. PATENT DOCUMENTS

| | | | |
|---|---|---|---|
| 9,164,808 B2* | 10/2015 | Parker | G06F 9/5083 |
| 2011/0078303 A1* | 3/2011 | Li | G06F 9/505 |
| | | | 709/224 |
| 2011/0167421 A1* | 7/2011 | Soundararajan | G06F 9/5077 |
| | | | 718/1 |
| 2014/0026133 A1* | 1/2014 | Parker | G06F 9/5083 |
| | | | 718/1 |
| 2014/0079207 A1* | 3/2014 | Zhakov | H04M 3/5175 |
| | | | 379/265.03 |
| 2015/0058844 A1* | 2/2015 | Conklin | G06F 9/45558 |
| | | | 718/1 |
| 2015/0121371 A1* | 4/2015 | Gummaraju | G06F 17/30194 |
| | | | 718/1 |
| 2015/0154057 A1* | 6/2015 | McGrath | G06F 9/45533 |
| | | | 718/1 |

FOREIGN PATENT DOCUMENTS

| | | |
|---|---|---|
| JP | 2012-221049 | 11/2012 |
| JP | 2013-506908 | 2/2013 |
| WO | 2011/041101 | 4/2011 |

\* cited by examiner

*Primary Examiner* — Diem Cao
(74) *Attorney, Agent, or Firm* — Fujitsu Patent Center

(57) ABSTRACT

A management apparatus deploys, when loads of one or more first virtual machines deployed on a first system satisfy a first load condition, one or more second virtual machines on a second system, and distributes processing of a business operation across the first and second virtual machines. The management apparatus allows a different second virtual machine to be added to the second system when, after the second virtual machines are deployed, the loads of the first virtual machines satisfy the first load condition and loads of the second virtual machines satisfy a second load condition. The management apparatus restricts the addition of the different second virtual machine to the second system when, after the second virtual machines are deployed, the loads of the first virtual machines satisfy the first load condition but the loads of the second virtual machines do not satisfy the second load condition.

4 Claims, 24 Drawing Sheets

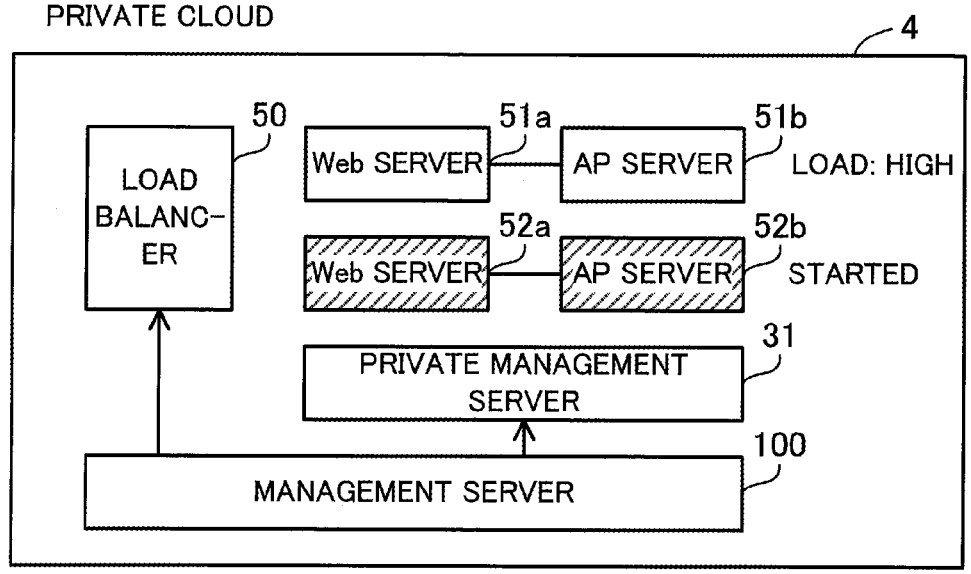
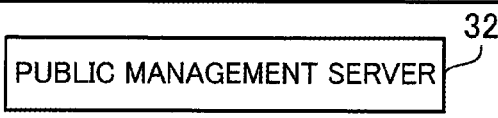
FIG. 5

VIRTUAL MACHINE NUMBER TABLE     131

| PARAMETER NAME | DESCRIPTION | VALUE |
|---|---|---|
| private_min | LOWER LIMIT OF NUMBER OF VMs IN PRIVATE CLOUD | 2 |
| private_limit | UPPER LIMIT OF NUMBER OF VMs IN PRIVATE CLOUD | 10 |
| private_vms | CURRENT NUMBER OF VMs IN PRIVATE CLOUD | 10 |
| public_limit | UPPER LIMIT OF NUMBER OF VMs IN PUBLIC CLOUD | 100 |
| public_vms | CURRENT NUMBER OF VMs IN PUBLIC CLOUD | 25 |

FIG. 16

LOAD DETERMINATION TABLE 132

| PARAMETER NAME | DESCRIPTION | VALUE |
| --- | --- | --- |
| private_loadTh | THRESHOLD OF LOADS IN PRIVATE CLOUD | 70 % |
| public_loadTh | THRESHOLD OF LOADS IN PUBLIC CLOUD | 80 % |

FIG. 17

VIRTUAL MACHINE
DEPLOYMENT TABLE    133

| VIRTUAL MACHINE NAME | DEPLOYMENT ZONE |
|---|---|
| VM001 | PRIVATE |
| VM002 | PRIVATE |
| VM003 | PRIVATE |
| VM101 | PUBLIC |
| VM102 | PUBLIC |
| VM103 | PUBLIC |
| VM104 | PUBLIC |

FIG. 18

| PRIVATE | | MIGRAT-ING | PUBLIC | | ACTION |
|---|---|---|---|---|---|
| LOAD | NUMBER OF VMs | | NUMBER OF VMs | LOAD | |
| HIGH | NOT AT UPPER LIMIT | NO | (0) | — | VMs ARE ADDED TO PRIVATE |
| | AT UPPER LIMIT | | 0 | — | VMs ARE ADDED TO PUBLIC |
| | | | ONE OR MORE | HIGH | |
| | | | | LOW | VMs ARE MIGRATED TO PUBLIC |
| | NOT AT LOWER LIMIT | YES | (ONE OR MORE) | LOW | |
| | AT LOWER LIMIT | | | LOW | NO ACTION IS TAKEN |
| | — | | | HIGH | VMs ARE ADDED TO PUBLIC |
| LOW | — | NO | (ONE OR MORE) | — | VMs ARE MIGRATED TO PRIVATE |
| | (AT UPPER LIMIT) | | ONE OR MORE | — | VMs ARE REMOVED FROM PUBLIC |
| | NOT AT LOWER LIMIT | | 0 | — | VMs ARE REMOVED FROM PRIVATE |
| | AT LOWER LIMIT | | | | NO ACTION IS TAKEN |

FIG. 19

MANAGEMENT APPARATUS AND WORKLOAD DISTRIBUTION MANAGEMENT METHOD

CROSS-REFERENCE TO RELATED APPLICATION

This application is based upon and claims the benefit of priority of the prior Japanese Patent Application No. 2014-029801, filed on Feb. 19, 2014, the entire contents of which are incorporated herein by reference.

FIELD

The embodiments discussed herein are related to a management apparatus and a workload distribution management method.

BACKGROUND

Cloud computing has been proposed as one way to utilize computer resources in recent years. In cloud computing, a user accesses a computer owned by a third party via a network and uses resources of the computer to conduct desired information processing, instead of outfitting a user's personal computer with resources needed for the desired information processing. A cloud system implementing cloud computing provides resources for users as services. It is often the case that a cloud system is implemented as a virtualization system allowing a plurality of virtual computers (sometimes referred to as "virtual machines" or "logic machines") to be deployed so as to flexibly allocate resources to a number of users.

Cloud computing is sometimes classified into three types of cloud services, private, public, and hybrid, in terms of the degree of resource sharing. In a private cloud, a single organization solely owns the cloud system and users of the organization (for example, users of various departments) use the cloud system, sharing the resources. In a public cloud, a service provider owns the cloud system and a large indefinite number of users use the cloud system via a wide area network. Public cloud services are offered to users, for example, by charging on a pay-as-you-go basis, i.e., charges are proportional to the usage, such as the number of virtual machines used, the amount of allocated resources, or the duration of use, based upon agreement between each user and the service provider. A hybrid cloud is a cloud computing environment where private and public cloud systems cooperate with each other.

In connection with hybrid cloud computing, a load balancer has been proposed which distributes work across internal servers in an enterprise network and cloud servers in a cloud network residing outside the enterprise network. The load balancer transfers requests from users to the internal servers while the loads placed on the internal servers are low, and transfers requests from users to cloud servers only when the loads on the internal servers are high. This helps the enterprise avoid capital expenditure on extra resources to deal with peak processing demand, thus reducing the cost of establishing and maintaining the internal servers. Note that there is also proposed a management server for migrating a virtual machine among a plurality of data centers. The management server calculates the degree of connectivity among a plurality of virtual machines from the volume of communication and the response speed among the virtual machines and selects a virtual machine to be migrated according to the calculated degree of connectivity.

International Publication Pamphlet No. WO 2011/041101
Japanese Laid-open Patent Publication No. 2012-221049

An application of cloud computing is considered herein where virtual machines deployed on system #1 are caused to process one particular business operation, and additional virtual machines are deployed on system #2 when the workloads placed on the virtual machines of system #1 become high to thereby distribute the processing of the particular business operation across the virtual machines in systems #1 and #2. For example, system #1 may be implemented as a private cloud system while system #2 may be implemented as a public cloud system. In this case, in response to an increase in the loads on the virtual machines of system #1, additional virtual machines may be deployed on system #2 in anticipation of reducing the load of each virtual machine.

However, system #1 may also include virtual machines engaging in a different business operation (for example, virtual machines used by a different department within the same company) other than the virtual machines in charge of the particular business operation above. When unused resources in the virtual machines dedicated to the particular business operation have increased, resources allocated to the virtual machines may be reduced by reallocating some of the resources to the virtual machines engaging in the different business operation. In this case, even if one or more virtual machines are added to system #2 for the particular business operation, the loads on the virtual machines in system #1 appear to still remain high. Thus, determining the addition of virtual machines to system #2 based only on the loads on the virtual machines in system #1 may lead to the deployment of an excessive number of virtual machines.

SUMMARY

According to one embodiment, there is provided a management apparatus including a communicating unit that acquires information indicating loads of one or more first virtual machines deployed on a first system, and acquire, when one or more second virtual machines are deployed on a second system, information indicating loads of the second virtual machines; and a processor that performs a procedure including deploying, when the loads of the first virtual machines satisfy a first load condition, the second virtual machines on the second system and distributing processing of a business operation across the first virtual machines and the second virtual machines, and allowing a different second virtual machine to be added to the second system when, after the second virtual machines are deployed, the loads of the first virtual machines satisfy the first load condition and the loads of the second virtual machines satisfy a second load condition, and restricting the addition of the different second virtual machine to the second system when, after the second virtual machines are deployed, the loads of the first virtual machines satisfy the first load condition but the loads of the second virtual machines do not satisfy the second load condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a first diagram illustrating an example of starting and stopping server applications;

FIG. 16 illustrates an example of a virtual machine number table;

FIG. 17 illustrates an example of a load determination table;

FIG. 18 illustrates an example of a virtual machine deployment table;

FIG. 19 illustrates an example of criteria for virtual machine deployment;

DESCRIPTION OF EMBODIMENTS

Figure 1:
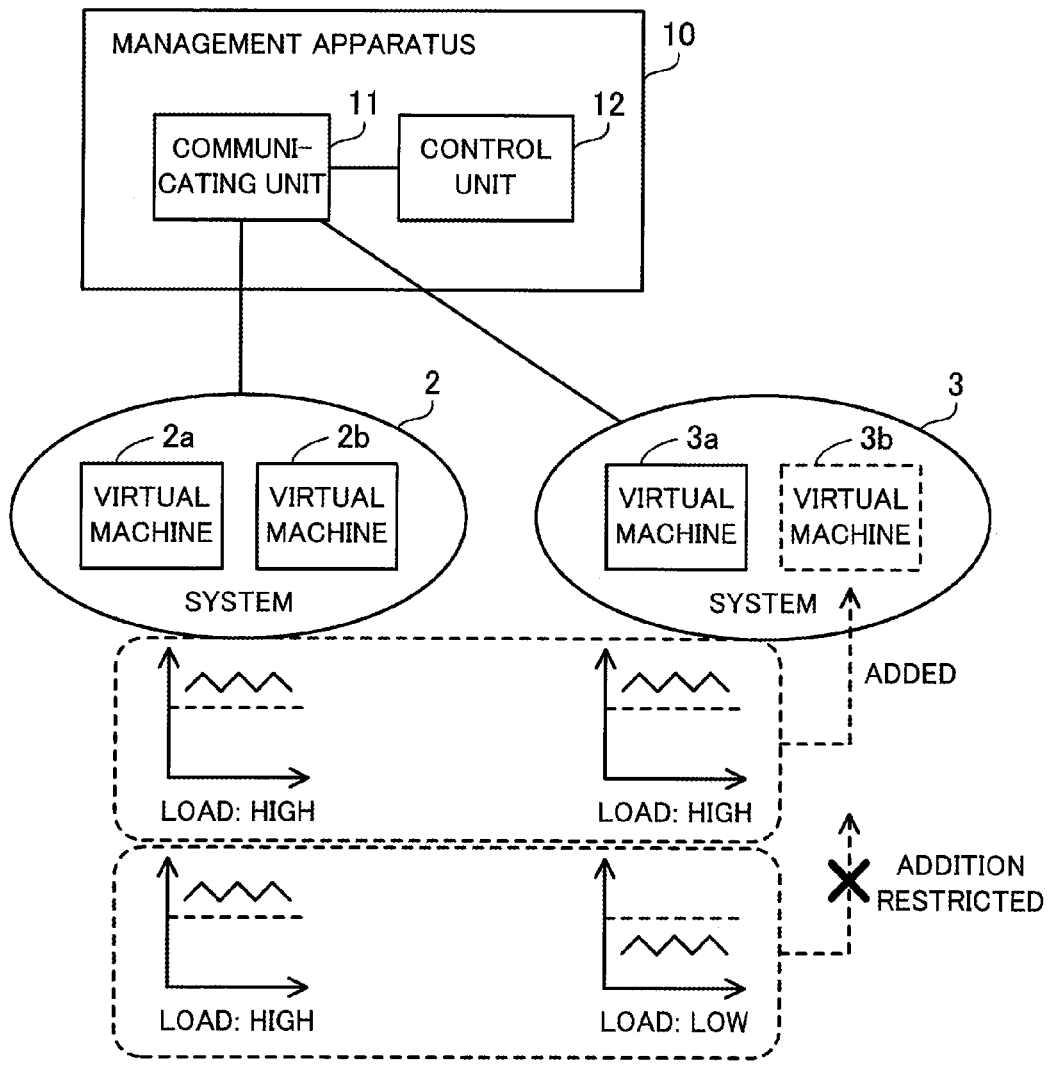
FIG. 1 illustrates an example of a management apparatus according to a first embodiment.

Several embodiments will be described below with reference to the accompanying drawings, wherein like reference numerals refer to like elements throughout.

(a) First Embodiment

FIG. 1 illustrates an example of a management apparatus according to a first embodiment. A management apparatus 10 of the first embodiment manages business processing load distribution using systems 2 and 3. Each of the systems 2 and 3 includes one or more physical computers (sometimes referred to as physical machines) capable of running virtual machines. The system 2 is preferentially used over the system 3 and implemented, for example, as a private cloud system. The system 3 is temporarily used in response to an increase in the loads on the system 2 and implemented, for example, as a public cloud system. The management apparatus 10 may manage a hybrid cloud which is an integrated cloud service utilizing both private and public clouds. The management apparatus 10 is implemented, for example, as a computer.

The management apparatus 10 includes a communicating unit 11 and a control unit 12. The communicating unit 11 is a communication interface for carrying out communication with the systems 2 and 3. The communicating unit 11 may be a wire communication interface connected to a communication device, such as a router or a switch, by a cable or a wireless communication interface connected to a base station by a wireless link. The control unit 12 determines the deployment of virtual machines on the systems 2 and 3, as described later. The control unit 12 may include a processor, which may be a central processing unit (CPU) or a digital signal processor (DSP). In addition, the processor may include an integrated circuit for particular use, such as an application specific integrated circuit (ASIC) or a field programmable gate array (FPGA). The processor is able to execute a program stored in a storage device, such as random access memory (RAM) or a hard disk drive (HDD). A set of two or more processors (multiprocessor) may be referred to as the "processor".

The communicating unit 11 acquires information indicating workloads of the one or more virtual machines deployed on the system 2. According to the first embodiment, virtual machines 2a and 2b have been deployed on the system 2. In this case, the communicating unit 11 acquires information indicating workloads of the virtual machines 2a and 2b. In addition, in the case where one or more virtual machines have been deployed on the system 3, the communicating unit 11 acquires information indicating workloads of the virtual machines in the system 3. When a virtual machine 3a is deployed on the system 3, as described later, the communicating unit 11 acquires information indicating workloads of the virtual machine 3a. The information indicating workloads shows, for example, CPU utilization of each virtual machine. The CPU utilization of each virtual machine is the percentage of CPU resources in use (for example, time spent processing instructions) to the total CPU resources (e.g. CPU time) allocated to the virtual machine.

Assume here that the virtual machines 2a and 2b are used to engage in the same business operation (for example, delivery of Web services). In the case where a plurality of virtual machines have been provided for a particular business operation, the processing of the business operation is distributed over the virtual machines.

The control unit 12 detects that the loads placed on the virtual machines 2a and 2b (for example, the average load between the virtual machines 2a and 2b) satisfy a first load condition. Then, the control unit 12 deploys the virtual machine 3a on the system 3 to thereby distribute the processing of the particular business operation across the virtual machines 2a, 2b, and 3a. For the distribution of the business operation processing, a load balancer may be employed. This is expected to lead to a reduction in the loads of the virtual machines 2a and 2b. The first load condition is, for example, that the loads of the virtual machine 2a and 2b have reached or exceeded a first threshold. In other words, when the loads of the virtual machines 2a and 2b have increased to high levels, the control unit 12 deploys the virtual machine 3a on the system 3 to distribute the increased loads.

After the deployment of the virtual machine 3a, the control unit 12 may detect that the loads of the virtual machines 2a and 2b satisfy the first load condition and the loads of the virtual machine 3a satisfy a second load condition. In that case, the control unit 12 allows addition of a virtual machine 3b to the system 3. When the virtual machine 3b is added, the business operation processing is distributed across the virtual machines 2a, 2b, 3a, and 3b. This is expected to lead to a reduction in the loads of the virtual machines 2a, 2b and 3a. The second load condition is, for example, that the loads of the virtual machine 3a have reached or exceeded a second threshold. In other words, when all the virtual machines 2a, 2b, and 3a are placed under high loads, the control unit 12 adds the virtual machine 3b to the system 3 to provide further load reduction.

On the other hand, after the deployment of the virtual machine 3a, the control unit 12 may detect that the loads of the virtual machines 2a and 2b satisfy the first load condition but the loads of the virtual machine 3a do not satisfy the second load condition. In that case, the control unit 12 restricts adding the virtual machine 3b to the system 3. When the loads of the virtual machine 3a in the system 3 are low, the loads of the virtual machines 2a and 2b in the system 2 possibly remain high due to a cause other than the business operation in which the virtual machines 2a, 2b, and 3a engage. Therefore, the control unit 12 determines that the addition of the virtual machine 3b to the system 3 is not expected to reduce the loads of the virtual machines 2a and 2b.

One possible cause that the loads of only the virtual machines 2a and 2b among the virtual machines 2a, 2b, and 3a remain high is that virtual machines used to engage in a different business operation have been deployed on the system 2. If load distribution has resulted in an increase in unused resources (for example, unused CPU resources) of the virtual machines 2a and 2b, resources having been allocated to the virtual machines 2a and 2b may be reduced by reallocating some of the resources to the virtual machines engaging in the different business operation. Then, the resource utilization (e.g. CPU utilization) of the virtual machines 2a and 2b is calculated to be high and, therefore, the loads of the virtual machines 2a and 2b appear to remain high. In this case, even if the virtual machine 3b is added to the system 3, the resource utilization of the virtual machines 2a and 2b is not expected to be reduced.

In view of the above, the management apparatus restricts the addition of the virtual machine 3b to the system 3. Note that the control unit 12 implements appropriate load balancing to increase the amount of the business operation processing assigned to the virtual machine 3a while decreasing the amount of the operation processing assigned to each of the virtual machines 2a and 2b, to thereby prevent a drop in response performance even when the loads of the virtual machines 2a and 2b remain high. In the case where the loads of the virtual machines 2a and 2b satisfy the first load condition but the loads of the virtual machine 3a do not satisfy the second load condition as described above, the control unit 12 may transfer at least a part of the virtual machines 2a and 2b deployed on the system 2 to the system 3.

According to the management apparatus 10 of the first embodiment, in the case where the loads of the virtual machines 2a and 2b satisfy the first load condition and the loads of the virtual machine 3a satisfy the second load condition, the virtual machine 3b is allowed to be added to the system 3. On the other hand, when the loads of the virtual machines 2a and 2b satisfy the first load condition but the loads of the virtual machine 3a do not satisfy the second load condition, the addition of the virtual machine 3b to the system 3 is restricted. Herewith, compared to the case of determining whether to add the virtual machine 3b based only on the loads of the virtual machines 2a and 2b, the addition of the virtual machine 3b is restricted in situations where the loads of the virtual machines 2a and 2b are not expected to be reduced, thus preventing the excessive virtual machine deployment on the system 3. As a result, in the case of being charged in the proportion of the use of the system 3 (pay-as-you-go system), it is possible to prevent an increase in charges due to the unnecessary deployment of an additional virtual machine.

(b) Second Embodiment

Figure 2:
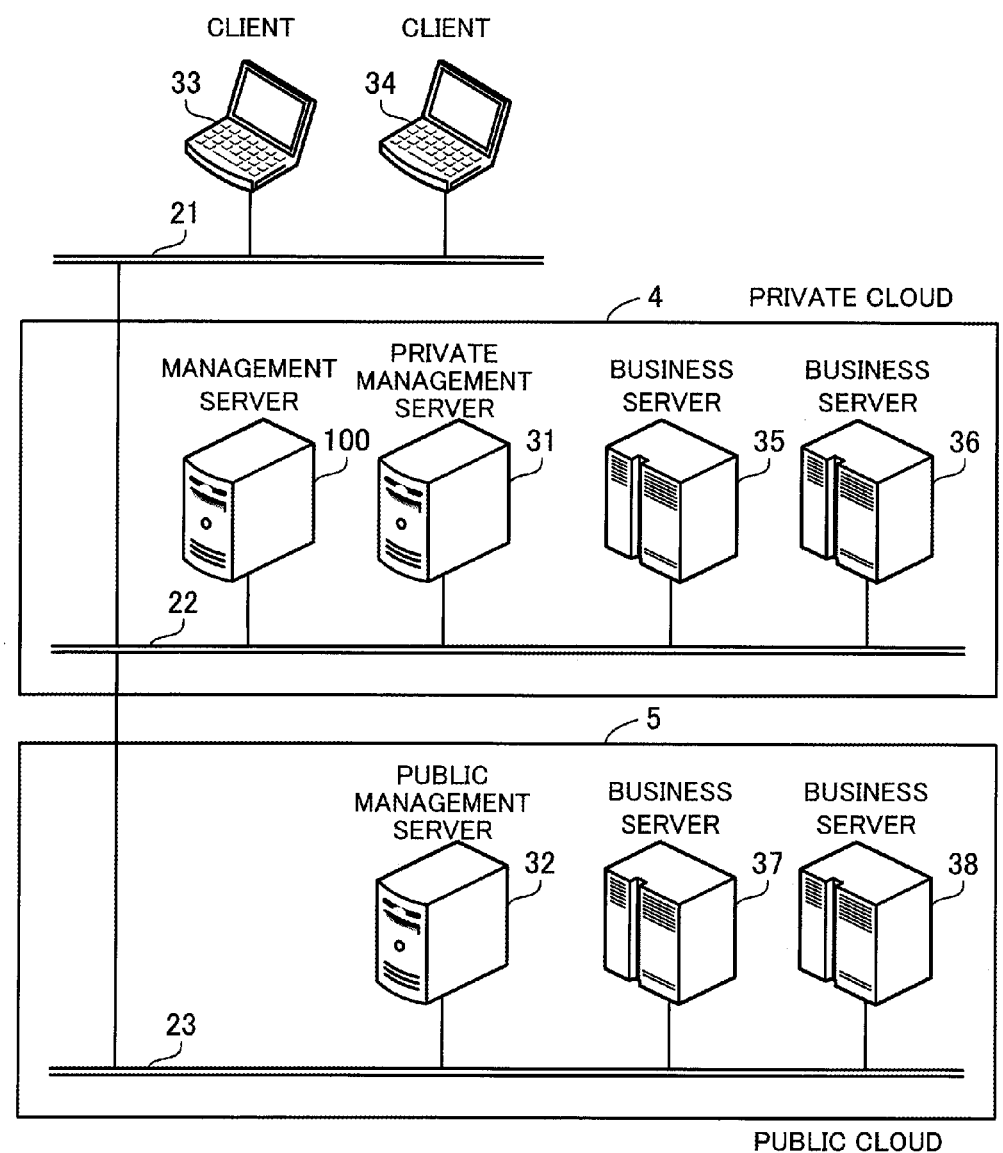
FIG. 2 illustrates an information processing system according to a second embodiment.

FIG. 2 illustrates an information processing system according to a second embodiment. An information processing system of the second embodiment includes a system implementing a private cloud 4 owned by a company and a system implementing a public cloud 5 owned by a service provider, to thereby implement a hybrid cloud. Clients 33 and 34 belong to a network 21 provided for users in the company. A private management server 31, business servers 35 and 36, and a management server 100 belong to a network 22 of the private cloud 4. A public management server 32 and business servers 37 and 38 belong to a network 23 of the public cloud 5. The network is connected to the network 22, which is then connected to the network 23 via a wide area network, such as the Internet.

The private management server 31 is a server computer for managing the private cloud 4. The private management server 31 provides the clients 33 and 34 with user interfaces used to set up virtual machines to be deployed on the business servers 35 and 36. In response to a request from each of the clients 33 and 34 or the management server 100, the private management server 31 starts or stops a virtual machine on the business server 35 or 36. In addition, the private management server 31 monitors the loads of virtual machines operating on the business servers 35 and 36.

The public management server 32 is a server computer for managing the public cloud 5. The public management server 32 provides the clients 33 and 34 with user interfaces used to set up virtual machines to be deployed on the business servers 37 and 38. In response to a request from each of the clients 33 and 34 or the management server 100, the public management server 32 starts or stops a virtual machine on the business server 37 or 38. In addition, the public management server 32 monitors the loads of virtual machines operating on the business servers 37 and 38.

Note that the public management server 32 is usually provided by a service provider. The public management server 32 provides the clients 33 and 34 and the management server 100 with a graphical user interface (GUI) or an application programming interface (API). Via the GUI or API, each user indirectly uses the public management server 32. The public management server 32 is sometimes referred to as the cloud portal.

The clients 33 and 34 are client computers, or terminal devices, operated by users. The clients 33 and 34 may be used by users engaging in different business operations (for example, users belonging to different departments within the company). To deploy a virtual machine on the private cloud 4 and cause the virtual machine to process a business operation, the client 33/34 accesses the private management server 31. On the other hand, to explicitly deploy a virtual machine on the public cloud 5 and cause the virtual machine to process the business operation, the client 33/34 accesses the public management server 32.

Note however that when having used the system of the public cloud 5, the company is charged on a pay-as-you-go basis, according to the usage, such as the number of virtual machines, the amount of allocated resources, or the duration of use. On the other hand, the use of the system of the private cloud 4 does not incur such pay-as-you-go charges. Therefore, the client 33/34 usually accesses the private management server 31 to preferentially use the system of the private cloud 4. In the case where the private cloud 4 temporarily runs out of resources, load distribution is implemented automatically by using resources of the public cloud 5, as described later. The client 33/34 need not be aware of the automatic load distribution.

The business servers 35 to 38 are server computers capable of causing a plurality of virtual machines to operate. According to an instruction from the private management server 31, the business server 35/36 allocates resources, such as CPU time and a RAM area, to a virtual machine and then starts the virtual machine. In addition, the business server 35/36 stops a virtual machine according to an instruction from the private management server 31. According to an instruction from the public management server 32, the business server 37/38 allocates resources to a virtual machine and then starts the virtual machine. In addition, the business server 37/38 stops a virtual machine according to an instruction from the public management server 32.

The management server 100 is a server computer for managing a hybrid cloud. The management server 100 adjusts, operation by operation, the number of virtual machines to be deployed on the private cloud 4 and the public cloud 5. In the case of deploying a virtual machine on the private cloud 4, the management server 100 instructs the private management server 31 to start the virtual machine. On the other hand, in the case of deploying a virtual machine on the public cloud 5, the management server 100 instructs the public management server 32 to start the virtual machine.

In order to adjust the number of virtual machines, the management server 100 acquires, from the private management server 31, information indicating the workload on each virtual machine (mainly the CPU utilization in the second embodiment). When the loads on virtual machines engaging in a particular business operation in the private cloud 4 are high, the management server 100 adds one or more virtual machines to the private cloud 4 until the number of virtual machines reaches an upper limit predetermined for the business operation. If the loads of virtual machines in the private cloud 4 remain still high even though the number of the virtual machines has reached the upper limit, the management server 100 deploys a virtual machine to engage in the particular business operation on the public cloud 5. In order to add a virtual machine to the public cloud 5, the management server 100 acquires information indicating the load on each virtual machine from the public management server 32 and takes account of both the loads in the private cloud 4 and those in the public cloud 5, as described later.

Figure 3:
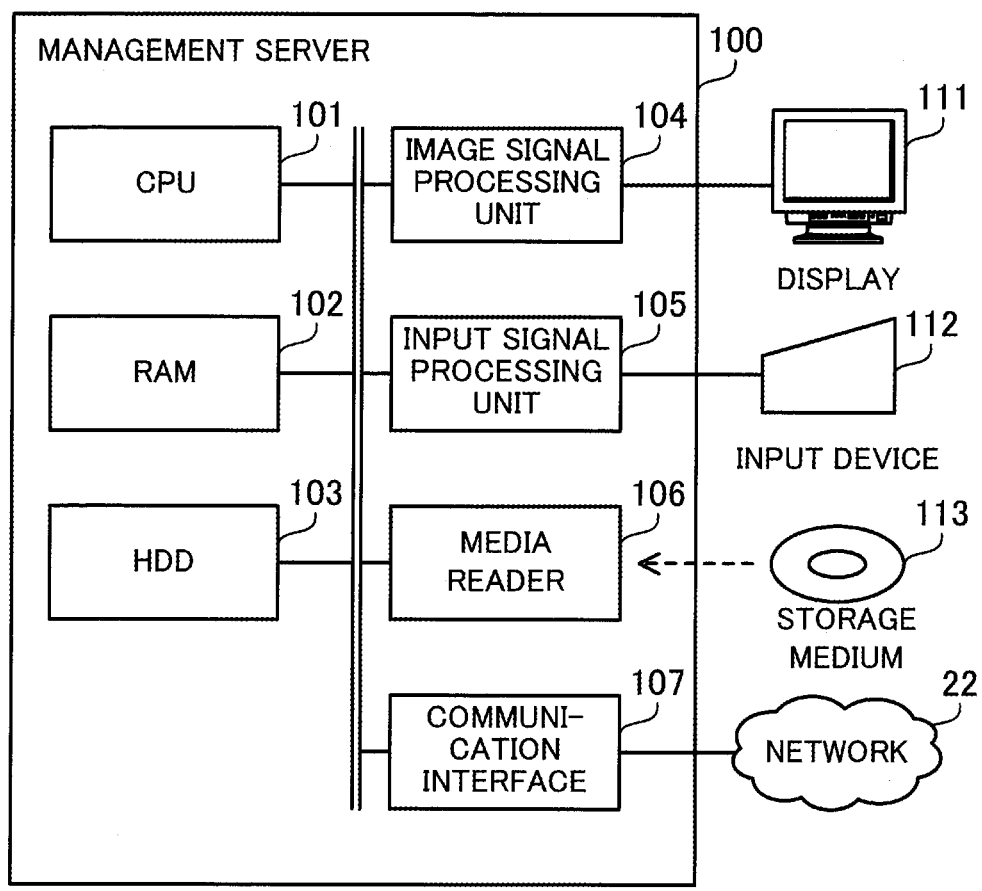
FIG. 3 is a block diagram illustrating an example of hardware of a management server.

FIG. 3 is a block diagram illustrating an example of hardware of a management server. The management server 100 includes a CPU 101, RAM 102, an HDD 103, an image signal processing unit 104, an input signal processing unit 105, a media reader 106, and a communication interface 107. The CPU 101 is an example of the control unit 12 of the first embodiment. In addition, the communication interface 107 is an example of the communicating unit 11 of the first embodiment.

The CPU 101 is a processor including a computing circuit for carrying out program instructions. The CPU 101 loads at least part of a program and data stored in the HDD 103 into the RAM 102 to execute the program. Note that the CPU 101 may include a plurality of processor cores and the management server 100 may include a plurality of processors, and processes to be described later may be executed in parallel using the plurality of processors or processor cores. In addition, a set of a plurality of processors (multiprocessor) may be referred to as the "processor".

The RAM 102 is a volatile memory for temporarily storing therein programs to be executed by the CPU 101 and data to be used by the CPU 101 for its computation. Note that the management server 100 may be provided with a different type of memory other than RAM, or may be provided with a plurality of memory devices.

The HDD 103 is a nonvolatile storage device to store therein software programs, such as an operating system (OS), middleware, and application software, and various types of data. Note that the management server 100 may be provided with a different type of storage device, such as a flash memory or a solid state drive (SDD), or may be provided with a plurality of non-volatile storage devices.

The image signal processing unit 104 outputs an image on a display 111 connected to the management server 100 according to an instruction from the CPU 101. Various types of displays including the following may be used as the display 111: a cathode ray tube (CRT) display; a liquid crystal display (LCD); a plasma display panel (PDP); and an organic electro-luminescence (OEL) display.

The input signal processing unit 105 acquires an input signal from an input device 112 connected to the management server 100 and sends the input signal to the CPU 101. Various types of input devices including the following may be used as the input device 112: a pointing device, such as a mouse, touch panel, touch-pad, or trackball; a keyboard; a remote controller; and a button switch. In addition, the management server 100 may be provided with a plurality of types of input devices.

The media reader 106 is a reader for reading programs and data recorded in a storage medium 113. As the storage medium 113, any of the following may be used: a magnetic disk, such as a flexible disk (FD) or HDD; an optical disk, such as a compact disc (CD) or digital versatile disc (DVD); a magneto-optical disk (MO); and a semiconductor memory. The media reader 106 stores programs and data read from the storage medium 113, for example, in the RAM 102 or the HDD 103.

The communication interface 107 is connected to the network 22 and communicates with a different computer, for example, the private management server 31, via the network 22. The communication interface 107 may be a wired communication interface connected via a cable to a communication apparatus, or a wireless communication interface connected via wireless links to a base station.

Note that the management server 100 may not be provided with the media reader 106, and further may not be provided with the image signal processing unit 104 and the input signal processing unit 105 in the case where these units are controllable from a terminal operated by a user. In addition, the display 111 and the input device 112 may be integrally provided on the chassis of the management server 100. The private management server 31, the public management server 32, the clients 33 and 34, and the business servers 35 to 38 may individually have the same hardware configuration as the management server 100.

Figure 4:
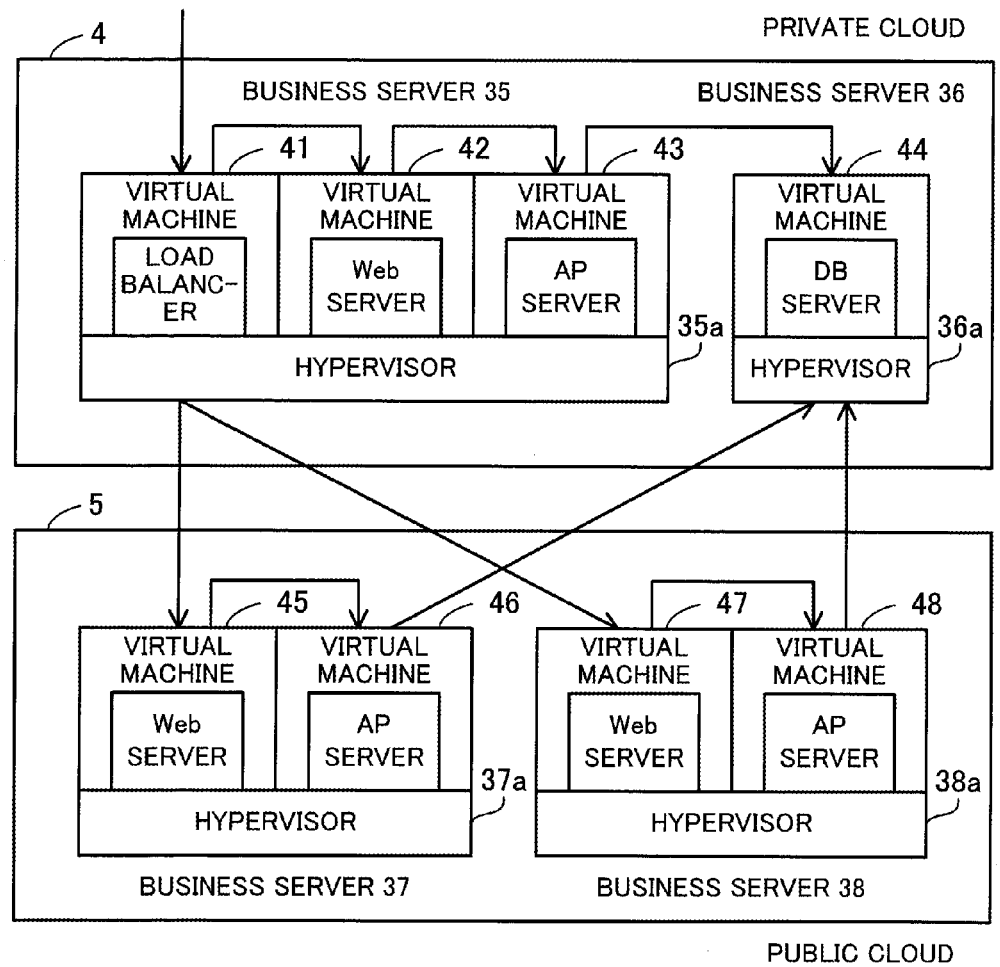
FIG. 4 is a block diagram illustrating an example of deployment of virtual machines.

FIG. 4 is a block diagram illustrating an example of deployment of virtual machines. The second embodiment describes the case in which the particular business operation is provision of Web services using a Web system implemented using a three-tier architecture. The Web system built based on the three-tier architecture includes a Web server, an application server (AP server), and a database server (DB server) as server applications. The Web server receives a Hypertext Transfer Protocol (HTTP) request transmitted from a client computer and returns a HTTP response to the HTTP request. The application server executes business logic according to the HTTP request received by the Web server and provides the Web server with the result of the execution of the business logic. The database server manages data possibly used by the business logic of the application server, and carries out data searches and updates according to requests from the application server.

In the case where a plurality of Web servers are deployed, HTTP requests sent from the client computers are distributed across the Web servers by a load balancer. According to the second embodiment, one each of a load balancer and database server are prepared and located in the private cloud 4. Locating the database server in the private cloud 4 reduces the risk of data leakage and loss, compared to locating it in the public cloud 5. On the other hand, the number of paired Web and application servers increases or decreases according to the loads, and such paired Web and application servers are located only in the private cloud 4, or in both the private cloud 4 and the public cloud 5.

For example, the business server 35 runs a hypervisor 35a; the business server 36 runs a hypervisor 36a; the business server 37 runs a hypervisor 37a; and the business server 38 runs a hypervisor 38a. Each of the hypervisors 35a, 36a, 37a, and 38a is middleware to allocate resources of the corresponding business server to virtual machines. Virtual machines 41 to 43 run on the hypervisor 35a; virtual machine 44 runs on the hypervisor 36a; virtual machines 45 and 46 run on the hypervisor 37a; and virtual machines 47 and 48 run on the hypervisor 38a. The virtual machine 41 runs the load balancer; each of the virtual machines 42, 45, and 47 runs a Web server; each of the virtual machines 43, 46, and 48 runs an application server; and the virtual machine 44 runs the database server.

In this case, the load balancer on the virtual machine 41 distributes HTTP requests received from the client computers across the virtual machines 42, 45, and 47. The Web server on the virtual machine 42 accesses the virtual machine 43; the Web server on the virtual machine 45 accesses the virtual machine 46; and the Web server on the virtual machine 47 accesses the virtual machine 48. Each of the application servers on the virtual machines 43, 46, and 48 executes business logic in response to a request from the corresponding Web server, and accesses the virtual machine 44 in the business logic. The database server on the virtual machine 44 carries out data searches and updates according to requests from the application servers.

The application server on the virtual machine transmits the result of the business logic to the virtual machine 42; the application server on the virtual machine 46 transmits the result of the business logic to the virtual machine 45; and the application server on the virtual machine 48 transmits the result of the business logic to the virtual machine 47. Each of the Web servers on the virtual machines 42, 45, and 47 generates an HTTP response from the received business logic result and then transmits the HTTP response to the virtual machine 41. The load balancer on the virtual machine 41 transfers the HTTP response to a corresponding client computer. Note that the load balancer monitors the number of HTTP requests being processed by each Web server to thereby estimate the load on the Web server, and transfers HTTP requests preferentially to Web servers with low loads.

Next described is load distribution achieved by starting a plurality of paired Web and application servers. FIG. 5 is a first diagram illustrating an example of starting and stopping server applications. Assume here that a load balancer 50, a Web server 51a, and an application server 51b are running in the private cloud 4. In addition, assume that, as for the business operation of providing Web services, the number of virtual machines deployed on the private cloud 4 has yet to reach the upper limit.

The management server 100 detects that the loads on virtual machines used to run the Web server 51a and the application server 51b are high. For example, the management server 100 detects that the average CPU utilization of the two virtual machines is equal to or more than a threshold. Then, the management server 100 instructs the private management server 31 to add virtual machines. The private management server 31 starts a virtual machine to run a Web server 52a and a virtual machine to run an application server 52b in the private cloud 4. In addition, the management server 100 sets the load balancer 50 to distribute HTTP requests also to the Web server 52a.

Figure 6:
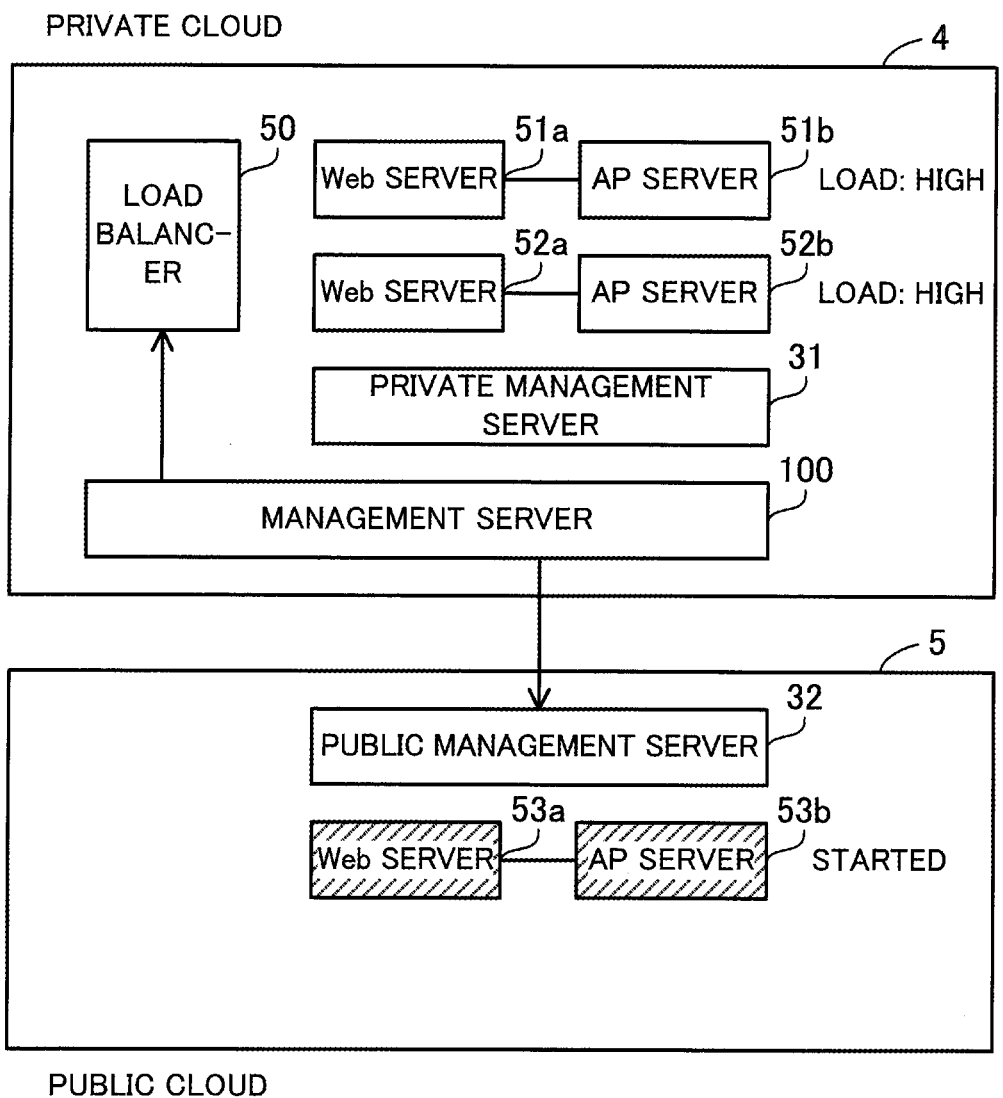
FIG. 6 is a second diagram illustrating the example of starting and stopping server applications.

FIG. 6 is a second diagram illustrating the example of starting and stopping server applications. The management server 100 detects that the loads on the virtual machines used to run the Web servers 51a and 52a and the application servers 51b and 52b remain high. For example, the management server 100 detects that the average CPU utilization of the four virtual machines is equal to or more than a threshold. Assume here that, as for the business operation of providing Web services, the number of virtual machines deployed on the private cloud has reached the upper limit. Then, the management server 100 instructs the public management server 32 to deploy virtual machines. The public management server 32 starts a virtual machine to run a Web server 53a and a virtual machine to run an application server 53b in the public cloud 5. In addition, the management server 100 sets the load balancer 50 to distribute HTTP requests also to the Web server 53a.

Figure 7:
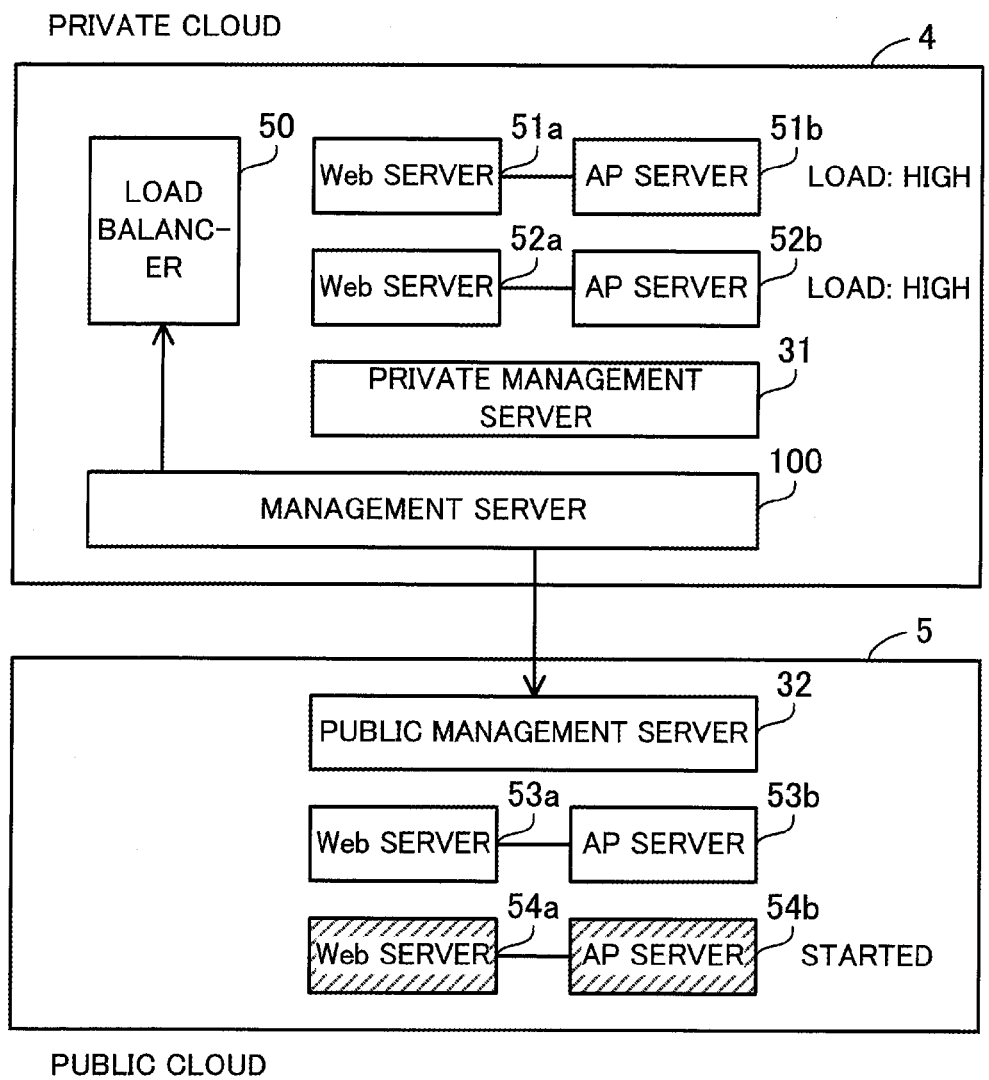
FIG. 7 is a third diagram illustrating the example of starting and stopping server applications.

FIG. 7 is a third diagram illustrating the example of starting and stopping server applications. Assume that the management server 100 has determined that current resources for the business operation of providing Web services are still insufficient (i.e., the number of virtual machines engaging in the operation is insufficient). Then, the management server 100 instructs the public management server 32 to add virtual machines. The public management server 32 starts a virtual machine to run a Web server 54a and a virtual machine to run an application server 54b in the public cloud 5. In addition, the management server 100 sets the load balancer 50 to distribute HTTP requests also to the Web server 54a.

Whether the resources are insufficient or not may be determined, for example, based on the loads on the virtual machines used to run the Web servers 51a and 52a and the application servers 51b and 52b located in the private cloud 4. In many cases, adding virtual machines to the public cloud 5 is expected to reduce the load on each virtual machine and, therefore, reduce the loads on the virtual machines deployed on the private cloud 4. However, as described below, there is a case where addition of virtual machines does not result in reducing the loads on the virtual machines in the private cloud 4. In such a case, determining the addition of virtual machines based only on the loads of the virtual machines in the private cloud 4 may lead to the deployment of an excessive number of virtual machines.

Figure 8:
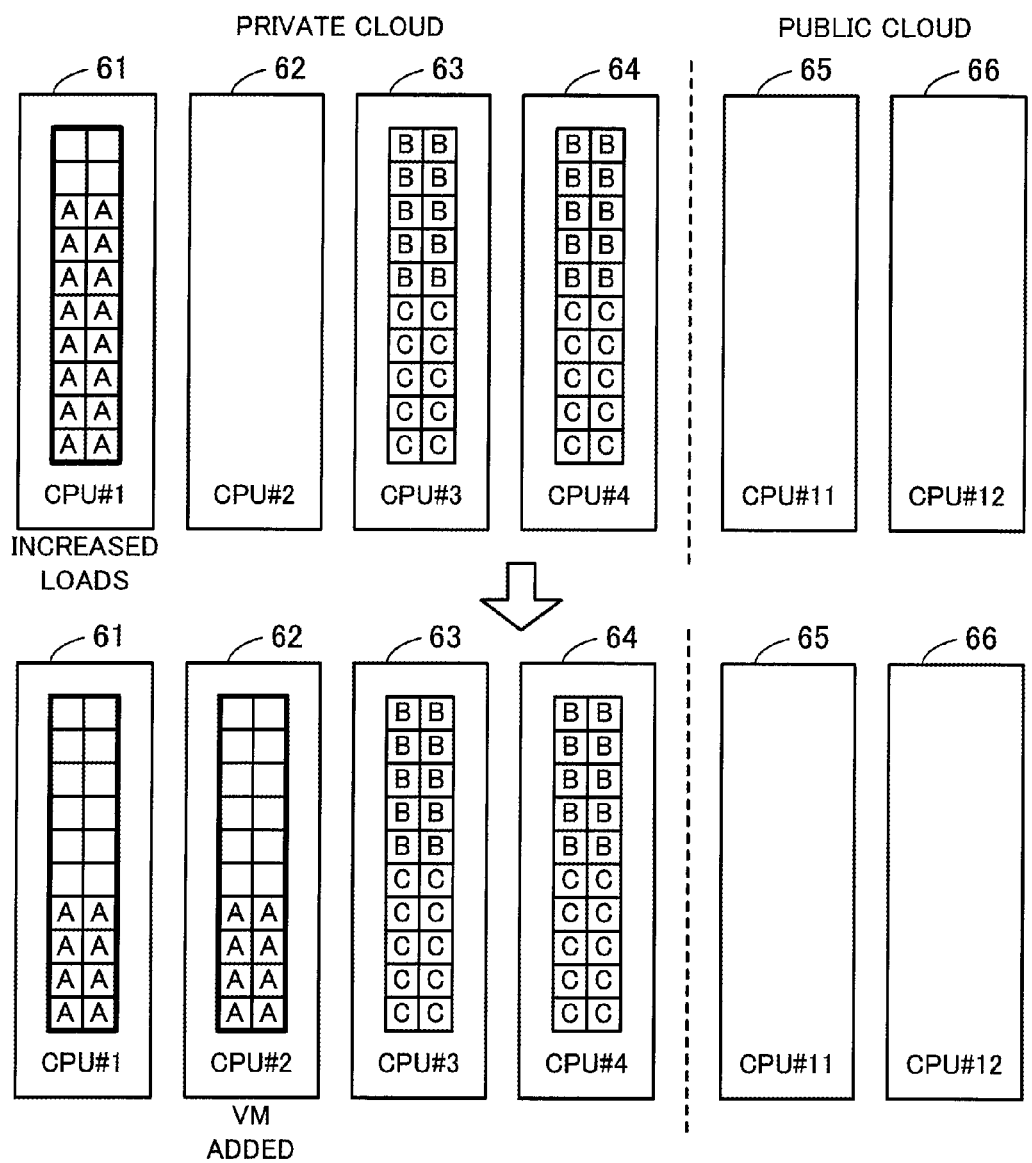
FIG. 8 is a first diagram illustrating an example of allocating CPU resources.

FIG. 8 is a first diagram illustrating an example of allocating CPU resources. Assume here that the system of the private cloud 4 is provided with CPUs 61 to (CPU#1 to CPU#4) and the system of the public cloud 5 is provided with a large number of CPUs including CPUs 65 and 66 (CPU#11 and CPU#12). For ease of explanation, all the CPUs have the same computing speed and 100% of the processing time of each CPU is defined as 100 resources. 100 resources of the CPU 61 are allocated to a single virtual machine used for Operation A. 50 resources of the CPU 63 and 50 resources of the CPU 64 are allocated for Operation B, and 50 resources of the CPU 63 and 50 resources of the CPU 64 are allocated for Operation C. In addition, assume that, when a virtual machine reaches a CPU utilization of 60% or higher, the load on the virtual machine is determined to be high. Further, the upper limit of the number of virtual machines allowed to be deployed on the private cloud 4 for Operation A is two.

When the CPU utilization of the virtual machine engaging in Operation A has increased to 80%, for example, the private management server 31 adds a virtual machine to be used for Operation A to the private cloud 4 and, then, allocates 100 resources of the CPU 62 to the added virtual machine. Herewith, the CPU utilization of each of the two virtual machines for Operation A is reduced to 40%.

Figure 9:
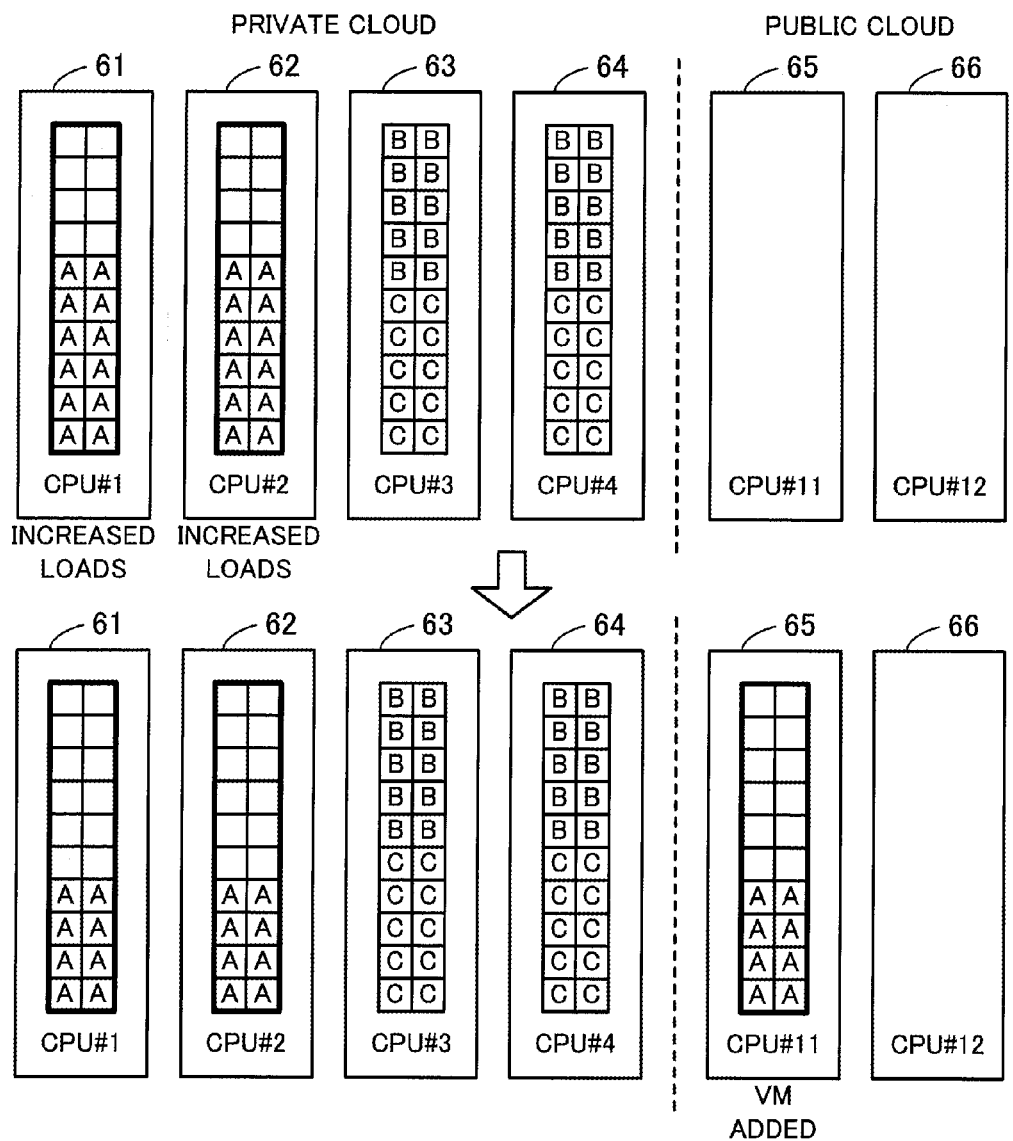
FIG. 9 is a second diagram illustrating the example of allocating CPU resources.

FIG. 9 is a second diagram illustrating the example of allocating CPU resources. Assume here that the CPU utilization of each of the virtual machine for Operation A has increased to 60%. At this point, the number of the virtual machines deployed on the private cloud 4 has reached the upper limit. Then, for example, the public management server 32 deploys a virtual machine to be used for Operation A on the public cloud 5 and allocates 100 resources of the CPU 65 to the deployed virtual machine. Herewith, the CPU utilization of each of the three virtual machines engaging in Operation A is reduced to 40%.

Figure 10:
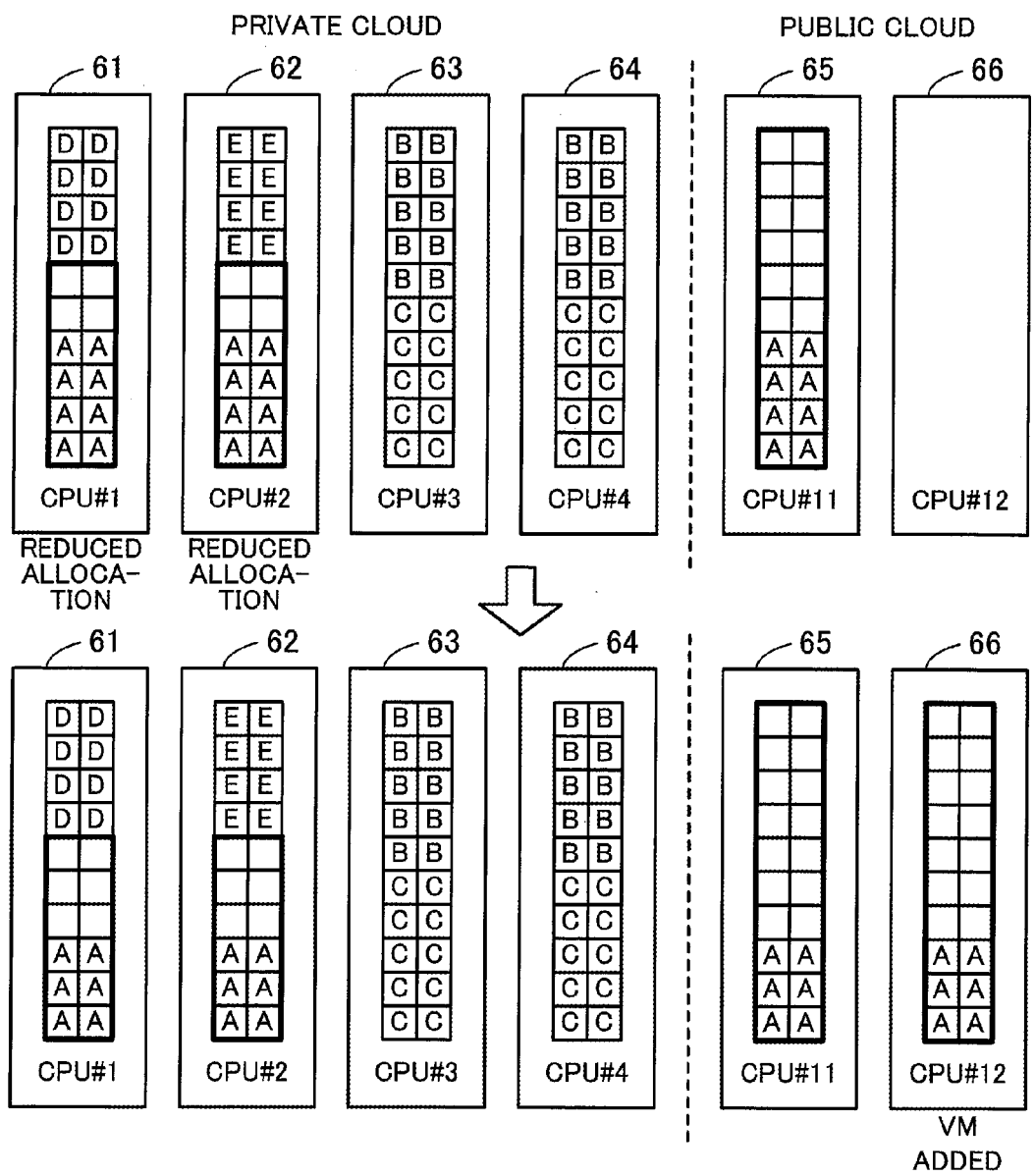
FIG. 10 is a third diagram illustrating the example of allocating CPU resources.

FIG. 10 is a third diagram illustrating the example of allocating CPU resources. Assume here that a user of Operation D and a user of Operation E have individually requested to start a virtual machine in the private cloud 4. At this point, the system of the private cloud 4 does not have unallocated CPU resources. Therefore, for example, the private management server 31 reduces the allocation to a virtual machine with plenty of unused CPU resources in terms of fairness among a plurality of business operations. Here, the allocation to the first virtual machine engaged on Operation A is reduced to 60 resources of the CPU 61, and the allocation to the second virtual machine engaged on Operation A is reduced also to 60 resources of the CPU 62.

With the reduction in the allocation, the CPU utilization of the virtual machines engaged on Operation A in the private cloud 4 is calculated to be 60% or more. Then, for example, the public management server 32 adds a virtual machine to be used for Operation A to the public cloud 5, and allocates 100 resources of the CPU 66 to the added virtual machine. Herewith, the CPU utilization of each of the virtual machines engaged on Operation A in the private cloud 4 is reduced to 50%.

However, when the entire system of the private cloud 4 is short of resources, the allocation of CPU resources to the Operation-A virtual machines may be further reduced with the reduction in the CPU utilization. Thus, there is a case where even if a virtual machine to be engaged on Operation A is added to the public cloud 5, the loads on the Operation-A virtual machines in the private cloud 4 are not reduced and remain high. In view of this, according to the second embodiment, the management server 100 determines whether the loads on the virtual machines deployed on the private cloud 4 are expected to be reduced, by referring also to the loads on the virtual machines deployed on the public cloud 5. In the case where the loads are not expected to be reduced, the management server 100 restricts increasing the total number of virtual machines.

Figure 11:
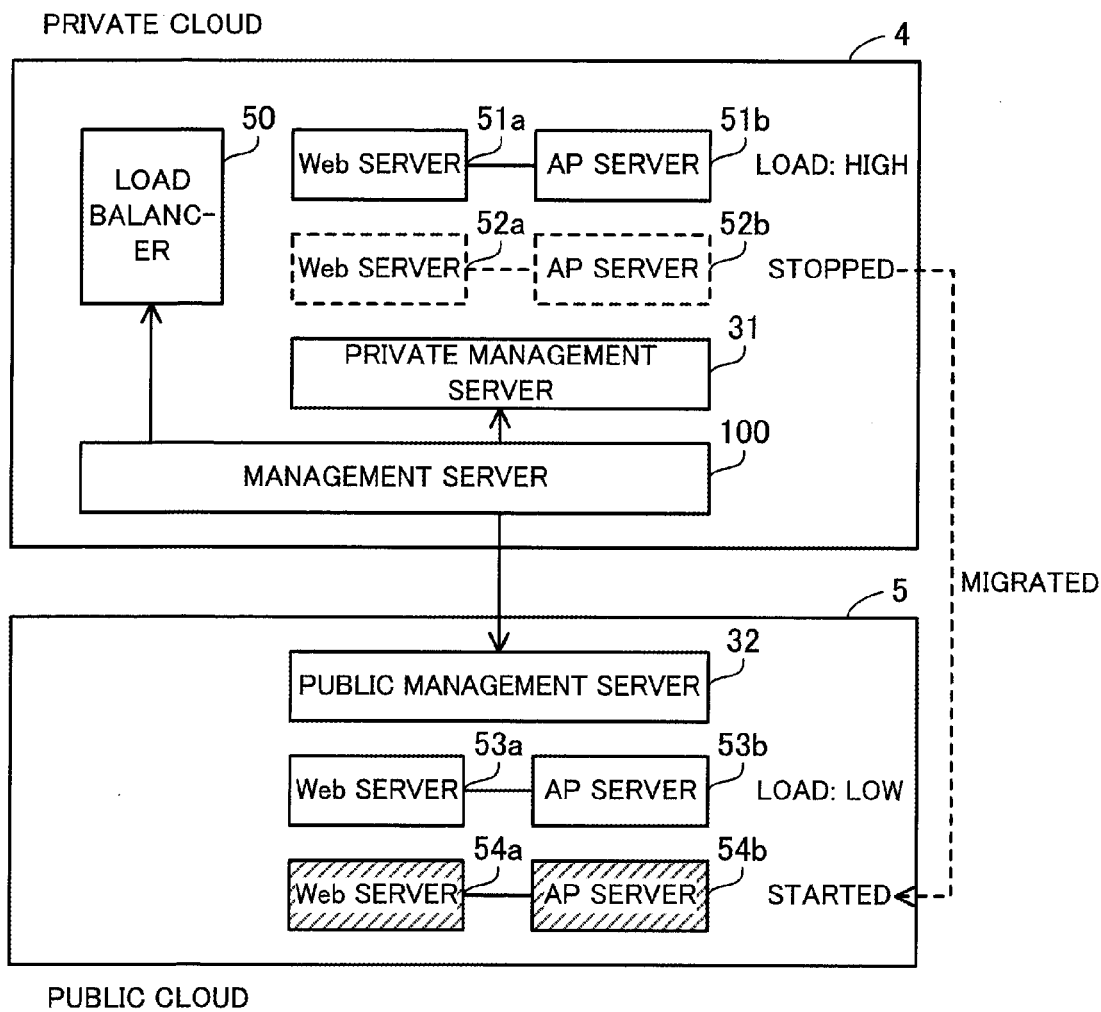
FIG. 11 is a fourth diagram illustrating the example of starting and stopping server applications.

FIG. 11 is a fourth diagram illustrating the example of starting and stopping server applications. The management server 100 detects that the loads on the virtual machines used to run the Web server 53*a* and the application server 53*b* are low while the loads on the virtual machines used to run the Web servers 51*a* and 52*a* and the application servers 51*b* and 52*b* are high. For example, the management server 100 detects that the average CPU utilization of the four virtual machines in the private cloud 4 is equal to or more than a threshold and the average CPU utilization of the two virtual machines in the public cloud 5 is less than the threshold. In this case, the management server 100 determines that the loads in the private cloud 4 are not reduced by increasing the number of virtual machines.

Subsequently, the management server 100 instructs the private management server 31 to reduce the number of virtual machines. The private management server 31 stops the virtual machines used to run the Web server 52*a* and the application server 52*b*. In addition, the management server 100 instructs the public management server 32 to add virtual machines. The public management server 32 starts a virtual machine to run a Web server 54*a* and a virtual machine to run an application server 54*b* in the public cloud 5. Further, the management server 100 sets the load balancer 50 to stop distributing HTTP requests to the Web server 52*a* and start distributing HTTP requests to the Web server 54*a*. With this, virtual machine migration from the private cloud 4 to the public cloud 5 is practically achieved.

Figure 12:
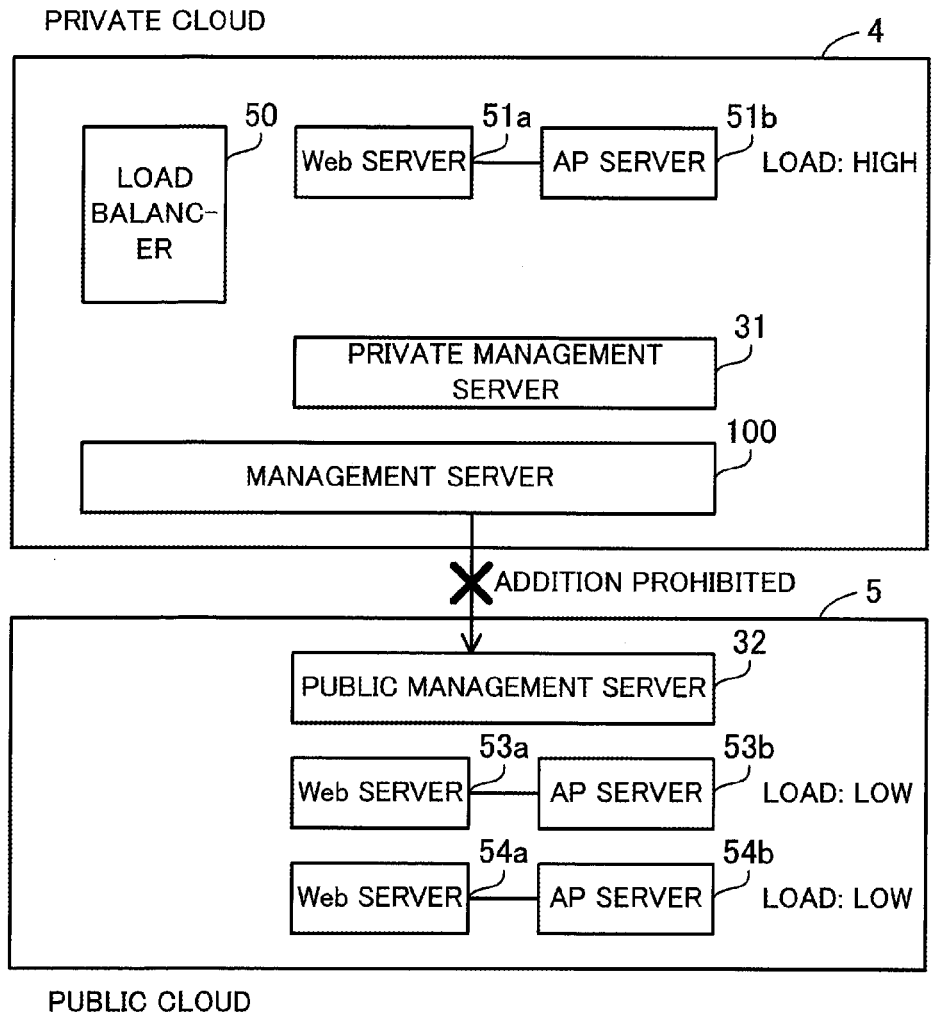
FIG. 12 is a fifth diagram illustrating the example of starting and stopping server applications.

FIG. 12 is a fifth diagram illustrating the example of starting and stopping server applications. The management server 100 detects that the loads on the virtual machines used to run the Web servers 53*a* and 54*a* and the application servers 53*b* and 54*b* are low while the loads on the virtual machines used to run the Web server 51*a* and the application server 51*b* are high. For example, the management server 100 detects that the average CPU utilization of the two virtual machines in the private cloud 4 is equal to or more than a threshold and the average CPU utilization of the four virtual machines in the public cloud 5 is less than the threshold. In this case, the management server 100 determines that the loads in the private cloud 4 are not reduced by increasing the number of virtual machines.

Therefore, the management server 100 does not increase the total number of virtual machines, as in the case of FIG. 11. In addition, since only the minimum number of virtual machines for providing Web services has been deployed on the private cloud 4, the management server 100 does not migrate virtual machines from the private cloud 4 to the public cloud 5. Maintaining, in the private cloud 4, the lower limit of the number of virtual machines set for each business operation allows processing of the business operation to be continued even if the system of the public cloud 5 abnormally stops. As a result, in this case, the management server 100 need not either migrate or add virtual machines.

Figure 13:
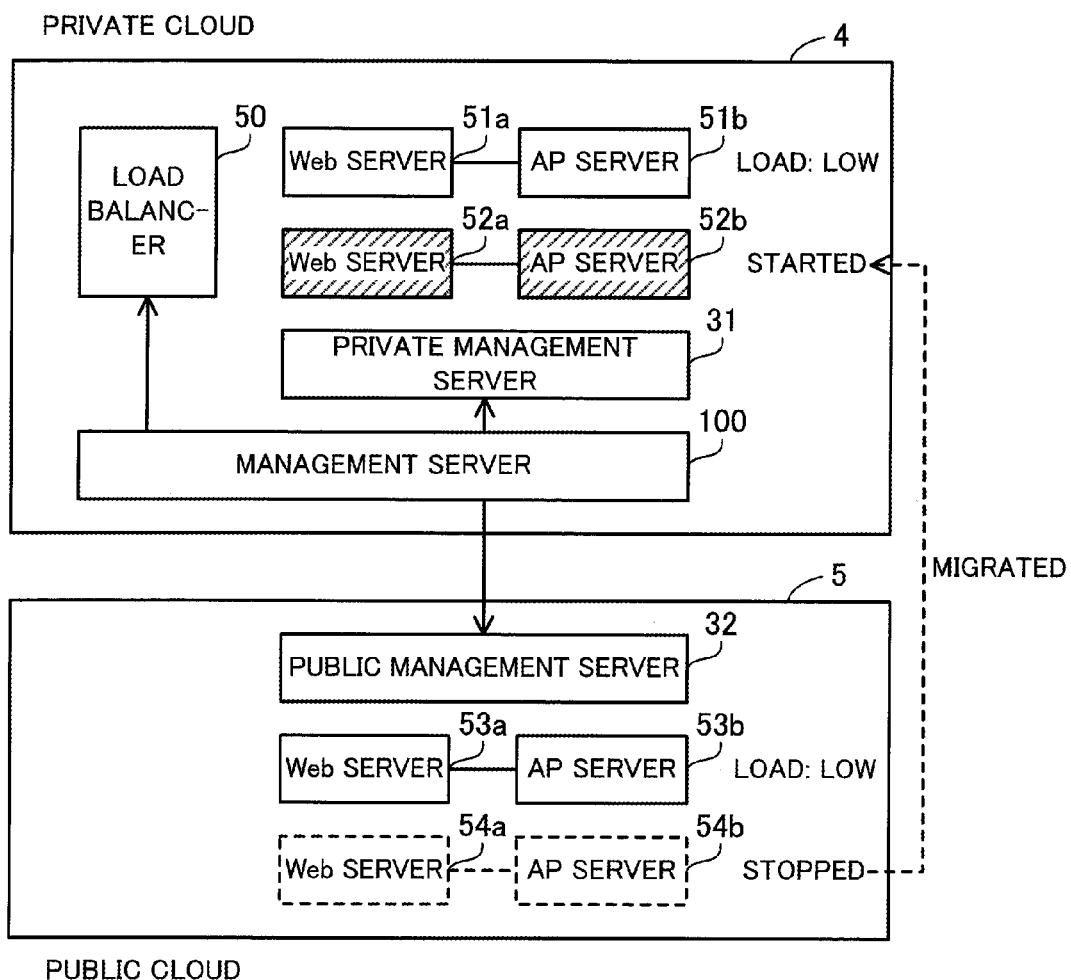
FIG. 13 is a sixth diagram illustrating the example of starting and stopping server applications.

FIG. 13 is a sixth diagram illustrating the example of starting and stopping server applications. The management server 100 detects that the loads on the virtual machines used to run the Web server 51*a* and the application server 51*b* have been reduced to be low. For example, the management server 100 detects that the average CPU utilization of the two virtual machines in the private cloud 4 has been reduced to less than a threshold. Subsequently, the management server 100 migrates virtual machines from the public cloud 5 to the private cloud 4, contrary to the case of FIG. 11.

That is, the management server 100 instructs the public management server 32 to reduce the number of virtual machines. The public management server 32 stops the virtual machines used to run the Web server 54a and the application server 54b. In addition, the management server 100 instructs the private management server 31 to add virtual machines. The private management server 31 starts a virtual machine to run the Web server 52a and a virtual machine to run the application server 52b in the private cloud 4. In addition, the management server 100 sets the load balancer 50 to stop distributing HTTP requests to the Web server 54a and start distributing HTTP requests to the Web server 52a. Virtual machine migration from the public cloud 5 to the private cloud 4 may be continued until the number of virtual machines deployed on the private cloud 4 reaches the upper limit.

Figure 14:
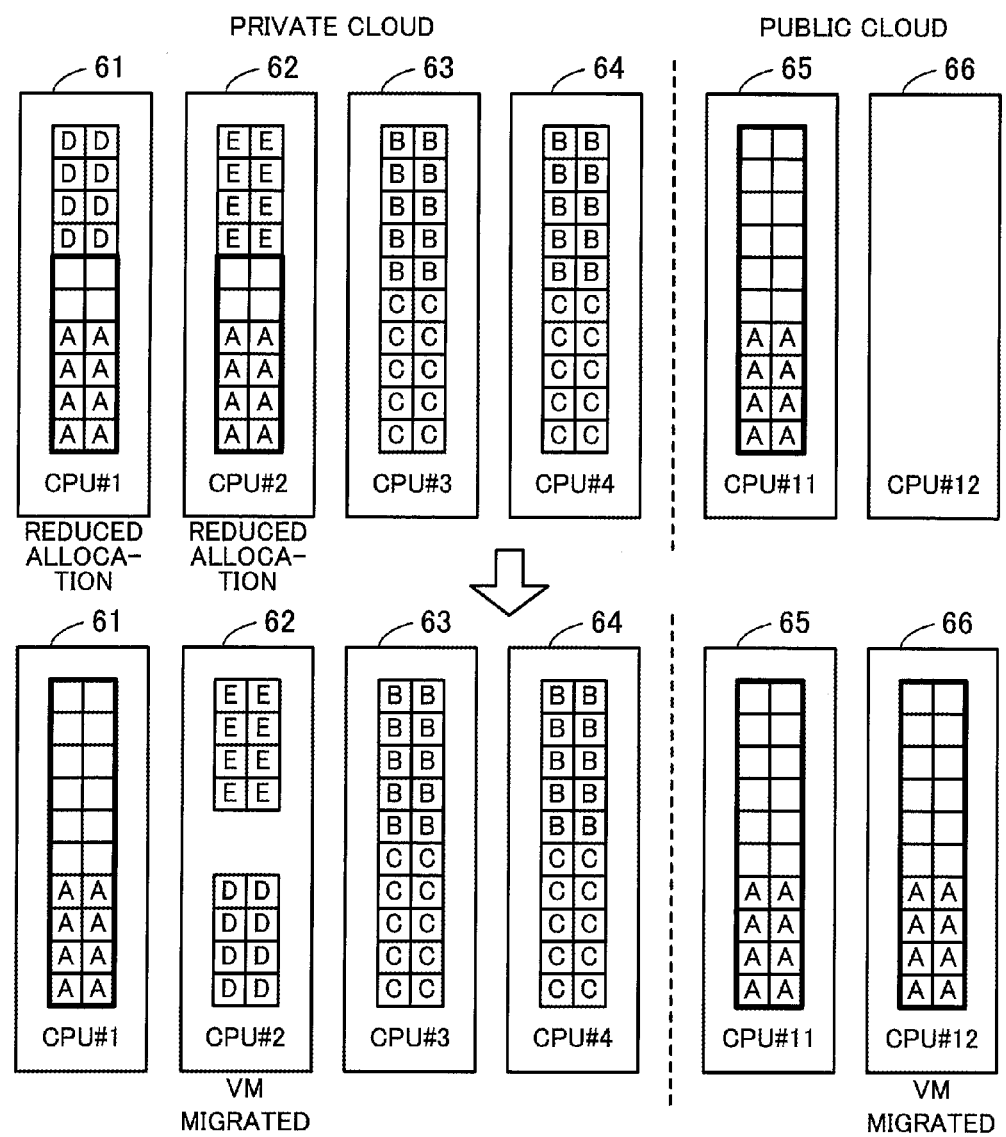
FIG. 14 is a fourth diagram illustrating the example of allocating CPU resources.

FIG. 14 is a fourth diagram illustrating the example of allocating CPU resources. Assume here that, as described in FIG. 10, the users of Operations D and E have individually requested to start a virtual machine in the private cloud 4. Then, assume that the allocation to the first virtual machine engaged on Operation A is reduced to 60 resources of the CPU 61, and the allocation to the second virtual machine engaged on Operation A is reduced also to 60 resources of the CPU 62.

Subsequently, the management server 100 detects that the CPU utilization of the virtual machines engaged on Operation A in the public cloud 5 is low (40%) while that of the virtual machines engaged on Operation A in the private cloud 4 is 60% or more. Therefore, the management server 100 determines that the loads in the private cloud 4 are not reduced by increasing the number of virtual machines to be used for Operation A and, thus, restricts increasing the number of virtual machines to be used for Operation A.

Instead, the management server 100 determines to migrate a virtual machine from the private cloud 4 to the public cloud 5. The private management server 31 releases 60 resources of the CPU 62 and stops one virtual machine engaged on Operation A. The public management server 32 adds a virtual machine to be used for Operation A to the public cloud 5 and allocates 100 resources of the CPU 66 to the added virtual machine. In the private cloud 4, unallocated CPU resources are created due to the stop of one virtual machine, and thus the allocation of CPU resources to the remaining virtual machine engaged on Operation A is expected to be increased.

Note that when the entire system of the private cloud 4 is short of resources, migration of virtual machines from the private cloud 4 to the public cloud 5 as in the case above may take place for each of a plurality of business operations. As a result, it is expected that the allocation of CPU resources to virtual machines remaining in the private cloud 4 be not reduced and, therefore, the loads on the virtual machines are reduced, not remaining high. According to the second embodiment, the lower limit of the number of virtual machines are maintained for each business operation; however, all virtual machines engaged on a particular business operation may be removed from the private cloud (i.e., the lower limit of the number for the business operation is zero).

Figure 15:
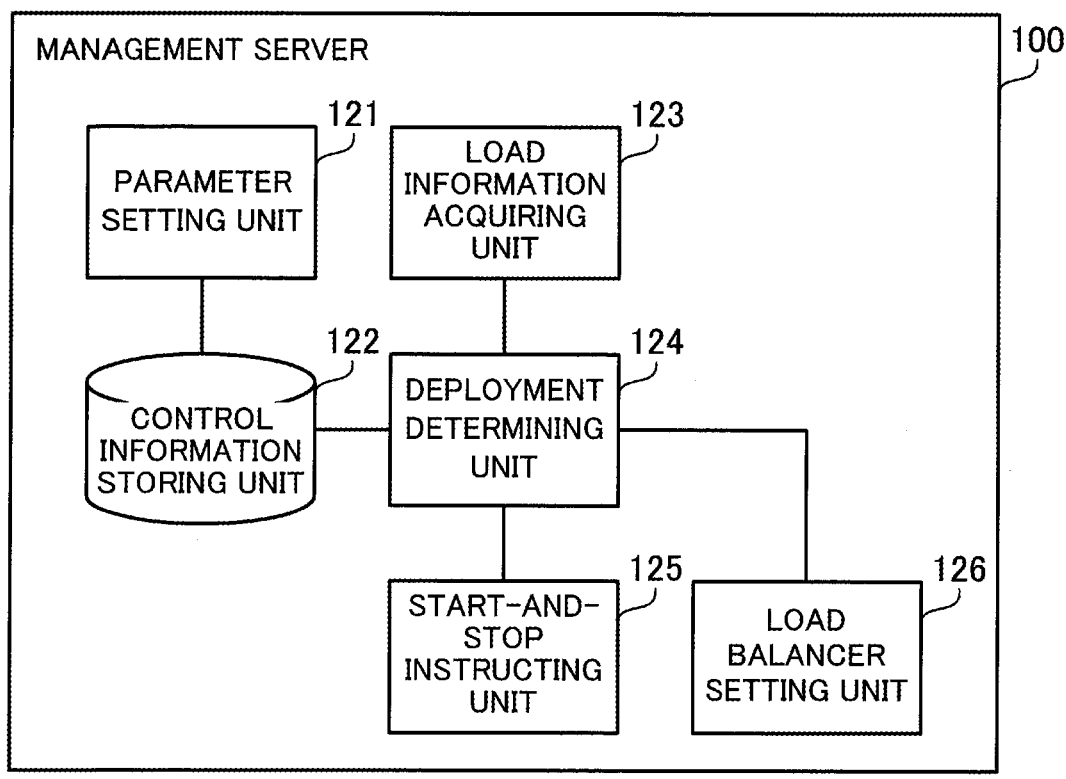
FIG. 15 is a block diagram illustrating an example of a software configuration of the management server.

Next described is load distribution control exercised by the management server 100. FIG. 15 is a block diagram illustrating an example of a software configuration of the management server. The management server 100 includes a parameter setting unit 121; a control information storing unit 122; a load information acquiring unit 123; a deployment determining unit 124; a start-and-stop instructing unit 125; and a load balancer setting unit 126. The control information storing unit 122 is implemented as a storage area, for example, provided in the RAM 102 or the HDD 103. The parameter setting unit 121, the load information acquiring unit 123, the deployment determining unit 124, the start-and-stop instructing unit 125, and the load balancer setting unit 126 are implemented, for example, as modules of a program executed by the CPU 101.

The parameter setting unit 121 acquires values of parameters input by a user using the input device 112, and stores the acquired parameter values in the control information storing unit 122 as control information. The parameter values are used for control of virtual machine deployment exercised by the deployment determining unit 124 and include the upper limit of the number of virtual machines deployed on the private cloud 4, as described later.

The control information storing unit 122 stores therein the control information used by the deployment determining unit 124 to exercise control over the deployment of virtual machines. As described above, the control information includes the parameter values acquired from the user by the parameter setting unit 121. In addition, the control information includes information indicating the state of deployment of virtual machines on the private cloud 4 and the public cloud 5.

The load information acquiring unit 123 periodically acquires, from the private management server 31, load information indicating workload on each of the virtual machines running on the business servers 35 and 36. For example, the CPU utilization, which is the percentage of CPU time consumed by a virtual machine for its processing to the total CPU time allocated to the virtual machine, is used as an index to indicate workload. As the workload on each virtual machine, either instantaneous load or average load over the most recent predetermined time period may be used. The load information acquiring unit 123 calculates, as loads associated with each business operation in the private cloud 4 (private load), the average load of virtual machines engaged on the business operation. In addition, in response to a request from the deployment determining unit 124, the load information acquiring unit 123 acquires, from the public management server 32, load information indicating workload on each of the virtual machines running on the business servers 37 and 38. The load information acquiring unit 123 calculates, as load associated with each business operation in the public cloud 5 (public loads), the average load of virtual machines engaged on the business operation.

The deployment determining unit 124 dynamically scales in and out virtual machines engaged on each business operation so that the processing of the business operation is appropriately distributed across a plurality of virtual machines. Scale-out is to increase the number of virtual machines to thereby expand the operation processing ability, while scale-in is to decrease the number of virtual machines to thereby shrink the operation processing ability. The deployment determining unit 124 periodically checks on the private load, and determines to start or stop virtual machines running on the business servers 35 to 38 according to the private load. As a general rule, virtual machines are deployed preferentially on the business servers 35 and 36, and then when the number of virtual machines in the private cloud 4 has reached the upper limit, virtual machines are deployed on the business servers 37 and 38. Note however that the deployment determining unit 124 may restrict addition of virtual machines to the business servers 37 and 38 according to the public load.

When start or stop of virtual machines on the business servers 35 and 36 has been determined, the start-and-stop instructing unit 125 instructs the private management server 31 to start or stop the virtual machines in response to a request from the deployment determining unit 124. In addition, when start or stop of virtual machines on the business servers 37 and 38 is determined, the start-and-stop instructing unit 125 instructs the public management server 32 to start or stop the virtual machines in response to a request from the deployment determining unit 124.

When start or stop of virtual machines on the business servers 35 to 38 is determined, the load balancer setting unit 126 updates setting information held by the load balancer in response to a request from the deployment determining unit 124. The setting information of the load balancer includes, for example, a list of addresses of virtual machines (for example, Internet Protocol (IP) addresses) to run server applications, across which HTTP requests are distributed. For example, the load balancer setting unit 126 adds the address of a virtual machine to the list when the virtual machine is started, and deletes the address of a virtual machine from the list when the virtual machine is stopped.

FIG. 16 illustrates an example of a virtual machine number table. A virtual machine number table 131 is prepared for each business operation and stored in the control information storing unit 122. FIG. 16 illustrates an example of the virtual machine number table 131 corresponding to one particular business operation. In the virtual machine number table 131, names of five parameters (private_min, private_limit, private_vms, public_limit, and public_vms) are registered in association with values of the parameters.

The "private_min" parameter indicates the lower limit of the number of virtual machines deployed on the private cloud 4 for the particular business operation. The "private_limit" parameter indicates the upper limit of the number of virtual machines allowed to be deployed in the private cloud 4 for the particular business operation. The "private_vms" parameter indicates the number of virtual machines currently deployed on the private cloud 4 for the particular business operation. The "public_limit" parameter indicates the upper limit of the number of virtual machines allowed to be deployed on the public cloud 5 for the particular business operation. The "public_vms" parameter indicates the number of virtual machines currently deployed on the public cloud 5 for the particular business operation. The values of private_min, private_limit, and public_limit are designated by the user.

FIG. 17 illustrates an example of a load determination table. A load determination table 132 is prepared for each business operation and stored in the control information storing unit 122. FIG. 17 illustrates an example of the load determination table 132 corresponding to one particular business operation. In the load determination table 132, names of two parameters (private_loadTh and public_loadTh) are registered in association with values of the parameters.

The "private_loadTh" parameter indicates the threshold used to determine whether the loads of virtual machines deployed on the private cloud 4 (i.e., the private load) for the particular business operation are high. The "public_loadTh" parameter indicates the threshold used to determine whether the loads of virtual machines deployed on the public cloud 5 (the public load) for the particular business operation are high. The values of private_loadTh and public_loadTh are designated by the user.

FIG. 18 illustrates an example of a virtual machine deployment table. The virtual machine deployment table 133 is prepared for each business operation and stored in the control information storing unit 122. FIG. 18 illustrates an example of the virtual machine deployment table 133 corresponding to one particular business operation. The virtual machine deployment table 133 includes columns of virtual machine name and deployment zone.

Each field in the virtual machine name column contains the identification information for identifying a virtual machine. The identification information may be a host name given to the virtual machine, or an address (for example, an IP address) assigned to the virtual machine. Each field in the deployment zone column contains the information indicating one of the business servers 35 and 36 in the private cloud 4 and the business servers 37 and 38 in the public cloud 5 on which the corresponding virtual machine is deployed. For example, "private" or "public" is registered in each field of the deployment zone column.

Next described are algorithms used to determine whether to start or stop virtual machines. FIG. 19 illustrates an example of criteria for virtual machine deployment. In FIG. 19, a migrating flag being set to YES (=1) indicates that addition of virtual machines to the public cloud 5 has been restricted and there are virtual machines having been migrated from the private cloud 4 to the public cloud 5. On the other hand, the migrating flag being set to NO (=0) indicates that there is no virtual machine having been migrated from the private cloud 4 to the public cloud 5 (including the case where migrated virtual machines have all been returned to the private cloud 4).

(1) When the private load is high; the number of virtual machines in the private cloud 4 has not reached the upper limit; and the migrating flag is set to NO, one or more virtual machines are added to the private cloud 4.

(2) When the private load is high; the number of virtual machines in the private cloud 4 is at the upper limit; the migrating flag is set to NO; and the number of virtual machines in the public cloud 5 is zero, one or more virtual machines are added to the public cloud 5.

(3) When the private load is high; the number of virtual machines in the private cloud 4 is at the upper limit; the migrating flag is set to NO; the number of virtual machines in the public cloud 5 is one or more; and the public load is high, one or more virtual machines are added to the public cloud 5.

(4) When the private load is high; the number of virtual machines in the private cloud 4 is at the upper limit; the migrating flag is set to NO; the number of virtual machines in the public cloud 5 is one or more; and the public load is low, one or more virtual machines are migrated from the private cloud 4 to the public cloud 5. With this, the migrating flag is updated to YES.

(5) When the private load is high; the number of virtual machines in the private cloud 4 is not at the lower limit; the migrating flag is set to YES; and the public load is low, one or more virtual machines are migrated from the private cloud 4 to the public cloud 5.

(6) When the private load is high; the number of virtual machines in the private cloud 4 is at the lower limit; the migrating flag is set to YES; and the public load is low, no action needs to be taken.

(7) When the private load is high; the migrating flag is set to YES; and the public load is high, one or more virtual machines are added to the public cloud 5.

(8) When the private load is low; and the migrating flag is set to YES, one or more virtual machines are migrated from the public cloud 5 to the private cloud 4. If the migration causes the number of virtual machines in the private cloud 4 to reach the upper limit, the migrating flag is updated to NO.

(9) When the private load is low; the migrating flag is set to NO; and the number of virtual machines in the public cloud 5 is one or more, the number of virtual machines in the public cloud 5 is cut back.

(10) When the private load is low; the number of virtual machines in the private cloud 4 is not at the lower limit; the migrating flag is set to NO; and the number of virtual machines in the public cloud 5 is zero, the number of virtual machines in the private cloud 4 is cut back.

(11) When the private load is low; the number of virtual machines in the private cloud 4 is at the lower limit; the migrating flag is set to NO; and the number of virtual machines in the public cloud 5 is zero, no action needs to be taken.

Figure 20:
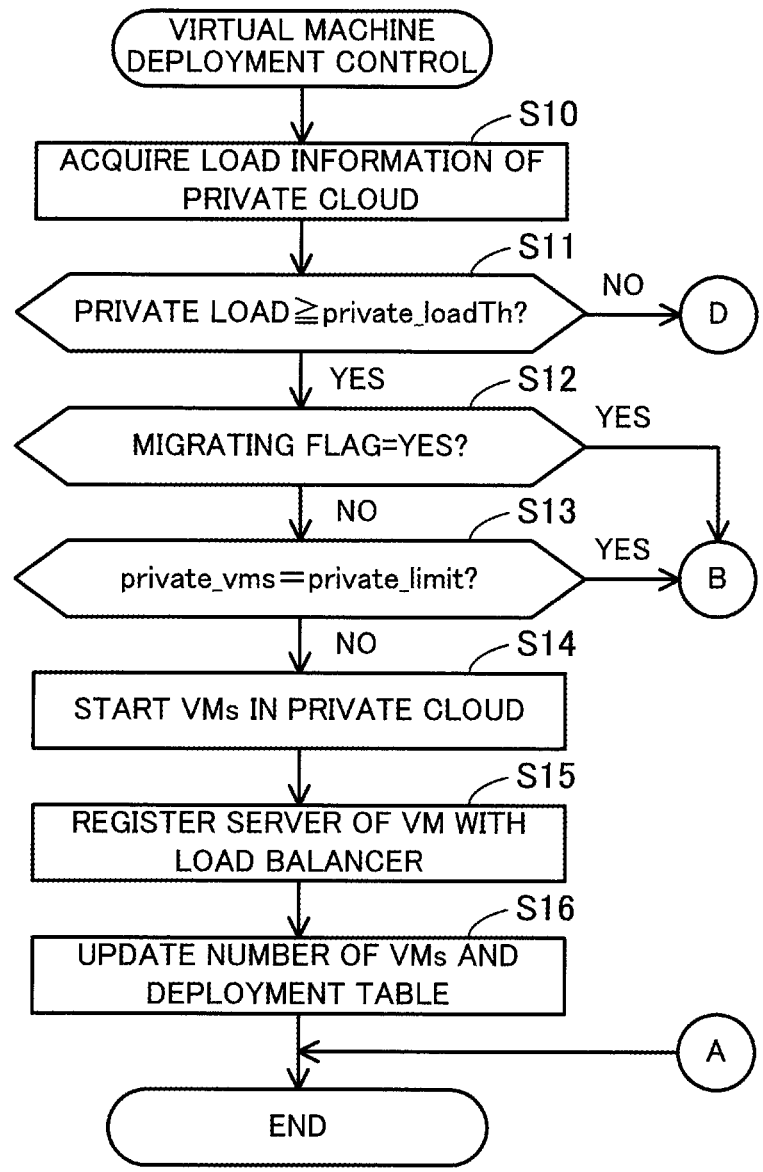
FIG. 20 is a first flowchart illustrating an example of a procedure for virtual machine deployment control.

FIG. 20 is a first flowchart illustrating an example of a procedure for virtual machine deployment control. The virtual machine deployment control is, for example, periodically exercised for each of a plurality of business operations.

(Step S10) The load information acquiring unit 123 acquires, from the private management server 31, load information indicating the load (for example, the CPU utilization) on each virtual machine in the private cloud 4. As the load on each virtual machine, either instantaneous load or average load over the most recent predetermined time period may be used. Based on the acquired load information, the load information acquiring unit 123 calculates the average load (for example, the average CPU utilization) among a plurality of virtual machines engaged on the particular business operation as the private load.

(Step S11) The deployment determining unit 124 reads the registered load threshold (private_loadTh) of the private cloud 4 from the load determination table 132 and determines whether the private load is equal to or more than private_loadTh. If the condition is satisfied, the process proceeds to step S12. If not, the process proceeds to step S40.

(Step S12) The deployment determining unit 124 determines whether the migrating flag is set to YES (or a value of 1). If the migrating flag is set to YES, the process proceeds to step S20. If the migrating flag is set to NO, the process proceeds to step S13. Note that the migrating flag may be held by the deployment determining unit 124, or registered in a table stored in the control information storing unit 122.

(Step S13) The deployment determining unit 124 reads the deployment number of virtual machines associated with the private cloud 4 (private_vms) and the upper limit associated with the private cloud 4 (private_limit) from the virtual machine number table 131. Subsequently, the deployment determining unit 124 determines whether private_vms has reached private_limit. If the condition is satisfied, the process proceeds to step S20. If not, the process proceeds to step S14.

(Step S14) The deployment determining unit 124 determines to start one or more virtual machines in the private cloud 4. The number of virtual machines to be started here is the minimum unit of virtual machines assigned to process the business operation, and may vary depending on the business operation. In the case of distributing workloads of Web and application servers in a three-tier Web system, for example, two virtual machines are started. The start-and-stop instructing unit 125 instructs the private management server 31 to start the virtual machines. The private management server 31 determines resources to be allocated to the virtual machines and then deploys the virtual machines on the business server 35 or 36. Note that image data used to start the virtual machines includes operating system programs and server application programs. The image data is stored in a predetermined storage device and transferred to the business server on which the virtual machines are deployed.

(Step S15) The load balancer setting unit 126 identifies a virtual machine to run a server application, to which HTTP requests are distributed (for example, a Web server), and registers the address of the virtual machine in the setting information held by the load balancer. Herewith, the processing of the business operation is distributed to the virtual machines started in the private cloud 4.

(Step S16) The deployment determining unit 124 updates the deployment number associated with the private cloud 4 (private_vms) registered in the virtual machine number table 131. At this point, private_vms is increased by the number of the started virtual machines. In addition, the deployment determining unit 124 registers identification information of the started virtual machines in the virtual machine deployment table 133. On this occasion, "private" is set in a corresponding field within the deployment zone column. Subsequently, the process ends.

Figure 21:
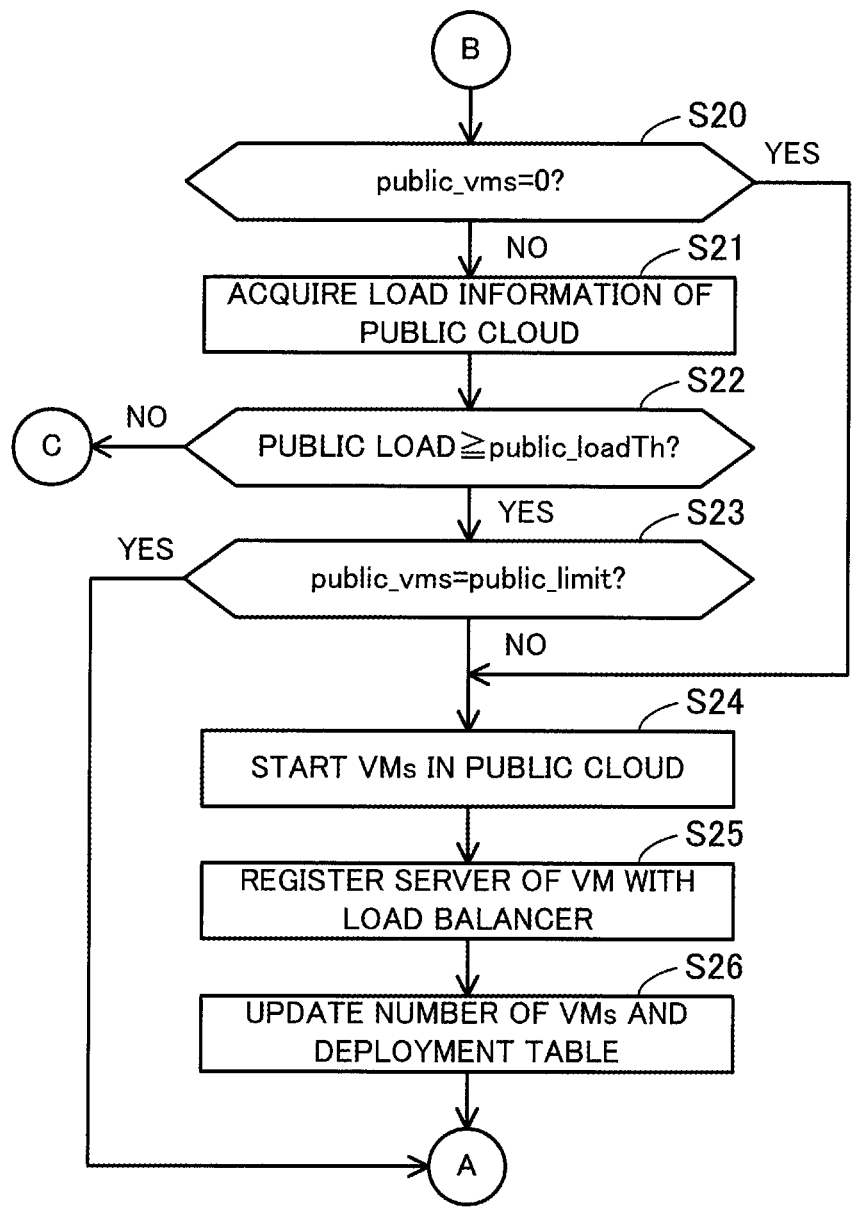
FIG. 21 is a second flowchart illustrating the example of the procedure for virtual machine deployment control.

FIG. 21 is a second flowchart illustrating the example of the procedure for virtual machine deployment control.

(Step S20) The deployment determining unit 124 reads the deployment number of virtual machines associated with the public cloud 5 (public_vms) from the virtual machine number table 131 and determines whether public_vms is 0. If the condition is satisfied, the process proceeds to step S24. If not (i.e., public_vms is one or more), the process proceeds to step S21.

(Step S21) The load information acquiring unit 123 acquires, from the public management server 32, load information indicating the load (for example, the CPU utilization) of each virtual machine in the public cloud 5. Based on the acquired load information, the load information acquiring unit 123 calculates the average load (e.g. the average CPU utilization) of a plurality of virtual machines engaged on the particular business operation as the public load.

(Step S22) the deployment determining unit 124 reads the registered load threshold associated with the public cloud 5 (public_loadTh) from the load determination table 132 and determines whether the public load is equal to or more than public_loadTh. If the condition is satisfied, the process proceeds to step S23.

If not, the process proceeds to step S30. (Step S23) The deployment determining unit 124 reads the deployment number associated with the public cloud 5 (public_vms) and the upper limit associated with the public cloud 5 (public_limit) from the virtual machine number table 131. Subsequently, the deployment determining unit 124 determines whether public_vms has reached public_limit. If the condition is satisfied, the process ends with no change to the current deployment of virtual machines. If not, the process proceeds to step S24.

(Step S24) The deployment determining unit 124 determines to start one or more virtual machines in the public cloud 5. In the case of distributing workloads of Web and application servers in a three-tier Web system, for example, two virtual machines are started. The start-and-stop instructing unit 125 instructs the public management server 32 to start the virtual machines. The public management server 32 determines resources to be allocated to the virtual machines and then deploys the virtual machines on the business server 37 or 38.

(Step S25) The load balancer setting unit 126 identifies a virtual machine to run a server application, to which HTTP requests are distributed (for example, a Web server), and registers the address of the virtual machine in the setting information held by the load balancer.

(Step S26) The deployment determining unit 124 updates the deployment number associated with the public cloud 5 (public_vms) registered in the virtual machine number table 131. At this point, public_vms is increased by the number of the started virtual machines. In addition, the deployment determining unit 124 registers identification information of the started virtual machines in the virtual machine deployment table 133. On this occasion, "public" is set in a corresponding field within the deployment zone column. Subsequently, the process ends.

Figure 22:
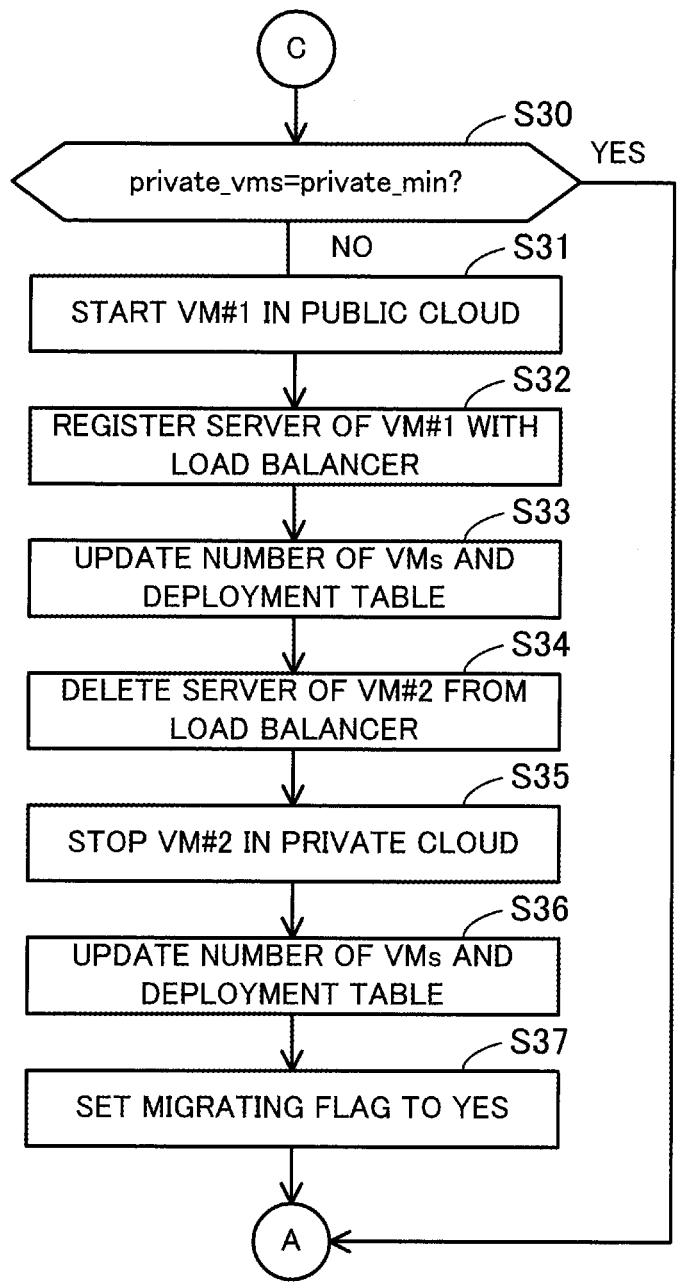
FIG. 22 is a third flowchart illustrating the example of the procedure for virtual machine deployment control.

FIG. 22 is a third flowchart illustrating the example of the procedure for virtual machine deployment control.

(Step S30) The deployment determining unit 124 reads, from the virtual machine number table 131, the deployment number associated with the private cloud 4 (private_vms) and the lower limit associated with the private cloud 4 (private_min). Then, the deployment determining unit 124 determines whether private_vms matches private_min. If the condition is satisfied, the process ends with no change to the current deployment of virtual machines. If not, the process proceeds to step S31.

(Step S31) The deployment determining unit 124 determines to start one or more virtual machines in the public cloud 5. In the case of distributing workloads of Web and application servers in a three-tier Web system, for example, two virtual machines are started. The start-and-stop instructing unit 125 instructs the public management server 32 to start the virtual machines. The public management server 32 determines resources to be allocated to the virtual machines and then deploys the virtual machines on the business server 37 or 38.

(Step S32) The load balancer setting unit 126 identifies a virtual machine to run a server application, to which HTTP requests are distributed (for example, a Web server), and registers the address of the virtual machine in the setting information held by the load balancer.

(Step S33) The deployment determining unit 124 updates the deployment number associated with the public cloud 5 (public_vms) registered in the virtual machine number table 131. At this point, public_vms is increased by the number of the started virtual machines. In addition, the deployment determining unit 124 registers identification information of the started virtual machines in the virtual machine deployment table 133. On this occasion, "public" is set in a corresponding field within the deployment zone column.

(Step S34) The deployment determining unit 124 determines to stop one or more virtual machines in the private cloud 4. The number of virtual machines to be stopped here is the minimum unit of virtual machines assigned to process the business operation, and is the same number of virtual machines started in step S31. The virtual machines to be stopped may be randomly selected from virtual machines running in the private cloud 4. The load balancer setting unit 126 identifies a virtual machine running a server application, to which HTTP requests are distributed (for example, a Web server), and to be stopped, and deletes the address of the virtual machine from the setting information held by the load balancer.

(Step S35) The start-and-stop instructing unit 125 instructs the private management server 31 to stop the virtual machines. The private management server 31 causes the operating systems of the designated virtual machines to be shut down and releases resources having been allocated to the stopped virtual machines.

(Step S36) The deployment determining unit 124 updates the deployment number associated with the private cloud 4 (private_vms) registered in the virtual machine number table 131. At this point, private_vms is reduced by the number of the stopped virtual machines. In addition, the deployment determining unit 124 deletes identification information of the stopped virtual machines from the virtual machine deployment table 133.

(Step S37) The deployment determining unit 124 sets the migrating flag to YES (or a value of 1). As a result of steps S31 to 36, virtual machine migration from the private cloud 4 to the public cloud 5 is achieved. Subsequently, the process ends.

Figure 23:
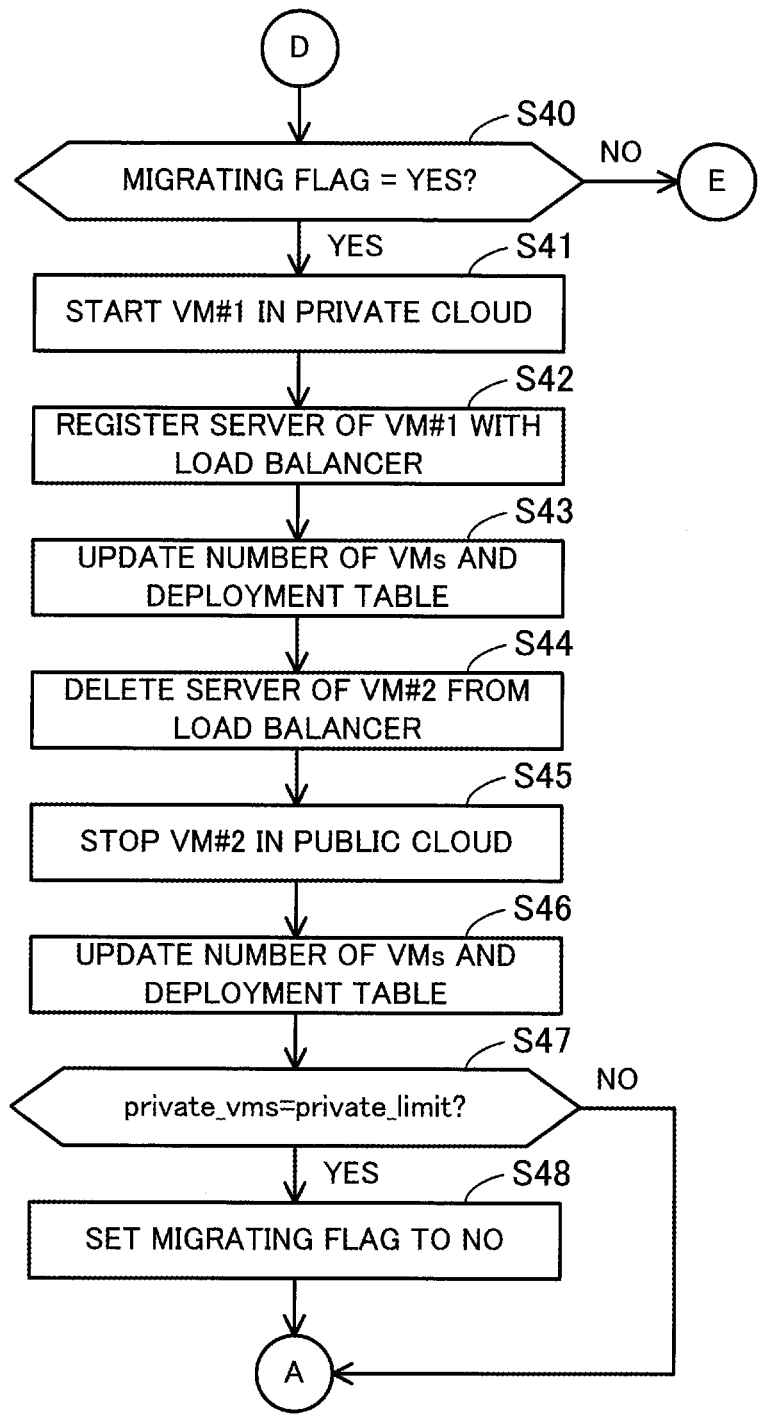
FIG. 23 is a fourth flowchart illustrating the example of the procedure for virtual machine deployment control.

FIG. 23 is a fourth flowchart illustrating the example of the procedure for virtual machine deployment control.

(Step S40) The deployment determining unit 124 determines whether the migrating flag is set to YES (or a value of 1). If the migrating flag is set to YES, the process proceeds to step S41. If the migrating flag is set to NO, the process proceeds to step S50.

(Step S41) The deployment determining unit 124 determines to start one or more virtual machines in the private cloud 4. In the case of distributing workloads of Web and application servers in a three-tier Web system, for example, two virtual machines are started. The start-and-stop instructing unit 125 instructs the private management server 31 to start the virtual machines. The private management server 31 determines resources to be allocated to the virtual machines and then deploys the virtual machines on the business server 35 or 36.

(Step S42) The load balancer setting unit 126 identifies a virtual machine to run a server application, to which HTTP requests are distributed (for example, a Web server), and registers the address of the virtual machine in the setting information held by the load balancer.

(Step S43) The deployment determining unit 124 updates the deployment number associated with the private cloud 4 (private_vms) registered in the virtual machine number table 131. At this point, private_vms is increased by the number of the started virtual machines. In addition, the deployment determining unit 124 registers identification information of the started virtual machines in the virtual machine deployment table 133. On this occasion, "private" is set in a corresponding field within the deployment zone column.

(Step S44) The deployment determining unit 124 determines to stop one or more virtual machines in the public cloud 5. The number of virtual machines to be stopped here is the minimum unit of virtual machines assigned to process the business operation, and is the same number of virtual machines started in step S41. The virtual machines to be stopped may be randomly selected from virtual machines running in the public cloud 5. The load balancer setting unit 126 identifies a virtual machine running a server application, to which HTTP requests are distributed (for example, a Web server), and to be stopped, and deletes the address of the virtual machine from the setting information held by the load balancer.

(Step S45) The start-and-stop instructing unit 125 instructs the public management server 32 to stop the virtual machines. The public management server 32 causes the operating systems of the designated virtual machines to be shut down and releases resources having been allocated to the stopped virtual machines.

(Step S46) The deployment determining unit 124 updates the deployment number associated with the public cloud 5 (public_vms) registered in the virtual machine number table 131. At this point, public_vms is reduced by the number of the stopped virtual machines. In addition, the deployment determining unit 124 deletes identification information of the stopped virtual machines from the virtual machine deployment table 133.

(Step S47) The deployment determining unit 124 reads the deployment number associated with the private cloud 4 (private_vms) and the upper limit associated with the private cloud 4 (private_limit) from the virtual machine number table 131. Subsequently, the deployment determining unit 124 determines whether private_vms has reached private_limit. If the condition is satisfied, the process proceeds to step S48. If not, the process ends.

(Step S48) The deployment determining unit 124 sets the migrating flag to NO (or a value of 0). As a result of steps S41 to 46, virtual machine migration from the public cloud 5 to the private cloud 4 is achieved. Subsequently, the process ends.

Figure 24:
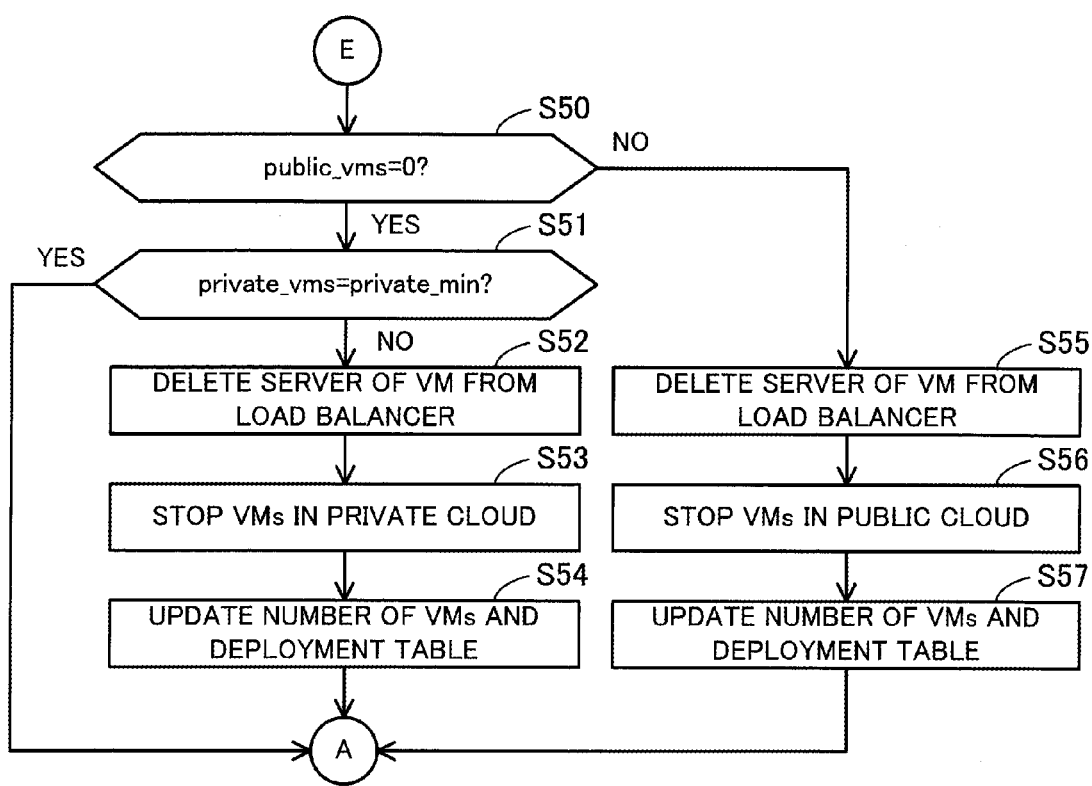
FIG. 24 is a fifth flowchart illustrating the example of the procedure for virtual machine deployment control.

FIG. 24 is a fifth flowchart illustrating the example of the procedure for virtual machine deployment control.

(Step S50) The deployment determining unit 124 reads the deployment number associated with the public cloud 5 (public_vms) from the virtual machine number table 131 and determines whether public_vms is 0. If the condition is satisfied, the process proceeds to step S51. If not (i.e., public_vms is one or more), the process proceeds to step S55.

(Step S51) The deployment determining unit 124 reads, from the virtual machine number table 131, the deployment number associated with the private cloud 4 (private_vms) and the lower limit associated with the private cloud 4 (private_min). Then, the deployment determining unit 124 determines whether private_vms matches private_min. If the condition is satisfied, the process ends. If not, the process proceeds to step S52.

(Step S52) The deployment determining unit 124 determines to stop one or more virtual machines in the private cloud 4. In the case of distributing workloads of Web and application servers in a three-tier Web system, for example, two virtual machines are stopped. The virtual machines to be stopped may be randomly selected from virtual machines running in the private cloud 4. The load balancer setting unit 126 identifies a virtual machine running a server application, to which HTTP requests are distributed (for example, a Web server), and to be stopped, and deletes the address of the virtual machine from the setting information held by the load balancer.

(Step S53) The start-and-stop instructing unit 125 instructs the private management server 31 to stop the virtual machines. The private management server 31 causes the operating systems of the designated virtual machines to be shut down and releases resources having been allocated to the stopped virtual machines.

(Step S54) The deployment determining unit 124 updates the deployment number associated with the private cloud 4 (private_vms) registered in the virtual machine number table 131. At this point, private_vms is reduced by the number of the stopped virtual machines. In addition, the deployment determining unit 124 deletes identification information of the stopped virtual machines from the virtual machine deployment table 133. Herewith, the operation processing ability using a plurality of virtual machines is reduced. Subsequently, the process ends.

(Step S55) The deployment determining unit 124 determines to stop one or more virtual machines in the public cloud 5. In the case of distributing workloads of Web and application servers in a three-tier Web system, for example, two virtual machines are stopped. The virtual machines to be stopped may be randomly selected from virtual machines running in the public cloud 5. The load balancer setting unit 126 identifies a virtual machine running a server application, to which HTTP requests are distributed (for example, a Web server), and to be stopped, and deletes the address of the virtual machine from the setting information held by the load balancer.

(Step S56) The start-and-stop instructing unit 125 instructs the public management server 32 to stop the virtual machines. The public management server 32 causes the operating systems of the designated virtual machines to be shut down and releases resources having been allocated to the stopped virtual machines.

(Step S57) The deployment determining unit 124 updates the deployment number associated with the public cloud 5 (public_vms) registered in the virtual machine number table 131. At this point, public_vms is reduced by the number of the stopped virtual machines. In addition, the deployment determining unit 124 deletes identification information of the stopped virtual machines from the virtual machine deployment table 133. Herewith, the operation processing ability using a plurality of virtual machines is reduced. Subsequently, the process ends.

According to the information processing system of the second embodiment, in the case where the workloads on the virtual machines in the private cloud 4 and those in the public cloud 5 are both high, it is allowed to add virtual machines to the public cloud 5. On the other hand, in the case where the workloads on the virtual machines in the public cloud 5 are low although those on the virtual machines in the private cloud 4 are high, adding further virtual machines to the public cloud 5 to thereby increase the total number of virtual machines is restricted.

Herewith, it is possible to prevent an excessive number of virtual machines from being deployed on the public cloud 5 when a reduction in the workloads in the private cloud 4 is not expected, thus enabling the efficient use of resources of the public cloud 5. In the case of being charged on a pay-as-you-go basis according to the usage of the resources of the public cloud 5, it is possible to reduce charges borne by the company.

In addition, while increasing the total number of virtual machines is being restricted, it is possible to reduce the number of virtual machines whose loads remain high by migrating virtual machines from the private cloud 4 to the public cloud 5. Further, the load balancer appropriately distributes HTTP requests so as to reduce the business operation processing of virtual machines whose loads are remaining high, thus controlling a delay in the response time. In addition, the minimum number of virtual machines are maintained in the private cloud 4, which allows the business operation to be continued even if the system of the public cloud 5 becomes temporarily not available due to a failure or the like, thus reducing the risk of operation suspension.

Note that the information processing of the first embodiment is implemented by causing the management apparatus 10 to execute a program, as described above. The information processing of the second embodiment is implemented by causing the private management server 31, the public management server 32, the clients 33 and 34, the business servers 35 to 38, and the management server 100 to execute programs.

The program may be recorded in a computer-readable storage medium (for example, the storage medium 113). Examples of such a computer-readable recording medium include a magnetic disk, an optical disk, a magneto-optical disk, and a semiconductor memory. Examples of the magnetic disk are a flexible disk (FD) and an HDD. Examples of the optical disk are a compact disc (CD), CD-recordable (CD-R), CD-rewritable (CD-RW), DVD, DVD-R, and DVD-RW. The program may be recorded on portable recording media for distribution. In that case, the program may be copied (installed) from a portable recording medium to another recording medium, for example, the HDD 103, and then executed.

According to one aspect, it is possible to prevent the deployment of an excessive number of virtual machines in workload distribution.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A management apparatus comprising:
   a communicating unit that acquires information indicating loads of one or more first virtual machines deployed on a first system, and acquire, when one or more second virtual machines are deployed on a second system, information indicating loads of the second virtual machines; and
   a processor that performs a procedure including:
      comparing loads of the first virtual machines with a first threshold,
      deploying, when the loads of the first virtual machines are equal to or greater than the first threshold, the second virtual machines on the second system and distributing processing of a business operation across the first virtual machines and the second virtual machines,
      comparing loads of the second virtual machines with a second threshold,
      allowing a different second virtual machine to be added to the second system when, after the second virtual machines are deployed, the loads of the first virtual machines are equal to or greater than the first threshold and the loads of the second virtual machines are equal to or greater than the second threshold,
      restricting the addition of the different second virtual machine to the second system when, after the second virtual machines are deployed, the loads of the first virtual machines are equal to or greater than the first threshold but the loads of the second virtual machines are smaller than the second threshold, and
      migrating at least one of the first virtual machines to the second system when the addition of the different second virtual machine is restricted because the loads of the first virtual machines are equal to or greater than the first threshold but the loads of the second virtual machines are smaller than the second threshold.

2. The management apparatus according to claim 1, wherein
   the procedure further includes migrating the at least one of the first virtual machines or at least one of the second virtual machines to the first system when, after the migrating of the at least one of the first virtual machines to the second system, loads of a different one or more of the first virtual machines deployed in the first system have fallen below the first threshold.

3. A business operation load distribution management method comprising:
   comparing, by a processor, loads of first virtual machines deployed on a first system with a first threshold;
   deploying, by the processor, when the loads of the first virtual machines are equal to or greater than the first threshold, one or more second virtual machines on a second system, and distributing processing of a business operation across the first virtual machines and the second virtual machines;
   comparing, by the processor, loads of the second virtual machines with a second threshold;
   allowing, by the processor, a different second virtual machine to be added to the second system when, after the second virtual machines are deployed, the loads of the first virtual machines are equal to or greater than the first threshold and the loads of the second virtual machines are equal to or greater than the second threshold;
   restricting, by the processor, the addition of the different second virtual machine to the second system when, after the second virtual machines are deployed, the loads of the first virtual machines are equal to or greater than the first threshold but the loads of the second virtual machines are smaller than the second threshold; and
   migrating, by the processor, at least one of the first virtual machines to the second system when the addition of the different second virtual machine is restricted because the loads of the first virtual machines are equal to or greater than the first threshold but the loads of the second virtual machines are smaller than the second threshold.

4. A non-transitory computer-readable storage medium storing a computer program that causes a computer to perform a procedure comprising:
   comparing loads of first virtual machines deployed on a first system with a first threshold;
   deploying, when the loads of the first virtual machines are equal to or greater than the first threshold, one or more second virtual machines on a second system, and distributing processing of a business operation across the first virtual machines and the second virtual machines;
   comparing loads of the second virtual machines with a second threshold;
   allowing a different second virtual machine to be added to the second system when, after the second virtual machines are deployed, the loads of the first virtual machines are equal to or greater than the first threshold and the loads of the second virtual machines are equal to or greater than the second threshold;
   restricting the addition of the different second virtual machine to the second system when, after the second virtual machines are deployed, the loads of the first virtual machines are equal to or greater than the first threshold but the loads of the second virtual machines are smaller than the second threshold; and
   migrating at least one of the first virtual machines to the second system when the addition of the different second virtual machine is restricted because the loads of the first virtual machines are equal to or greater than the first threshold but the loads of the second virtual machines are smaller than the second threshold.

* * * * *